(12) United States Patent
Perritt, Jr.

(10) Patent No.: US 12,409,564 B1
(45) Date of Patent: Sep. 9, 2025

(54) SYSTEM AND METHOD FOR RETRIEVING OBJECTS

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/090,777

(22) Filed: Mar. 26, 2025

(51) Int. Cl.
| | |
|---|---|
| *B25J 15/00* | (2006.01) |
| *A46B 5/02* | (2006.01) |
| *A46B 15/00* | (2006.01) |
| *A47L 13/12* | (2006.01) |
| *A47L 13/41* | (2006.01) |
| *A47L 13/42* | (2006.01) |
| *A47L 13/52* | (2006.01) |
| *A47L 25/00* | (2006.01) |
| *B25J 1/04* | (2006.01) |

(52) U.S. Cl.
CPC .......... *B25J 15/0057* (2013.01); *A46B 5/021* (2013.01); *A46B 5/026* (2013.01); *A46B 15/0055* (2013.01); *A47L 13/12* (2013.01); *A47L 13/41* (2013.01); *A47L 13/42* (2013.01); *A47L 13/52* (2013.01); *A47L 25/005* (2013.01); *B25J 1/04* (2013.01); *A46B 2200/302* (2013.01)

(58) Field of Classification Search
CPC ......... B25J 15/0057; B25J 1/04; A46B 5/021; A46B 5/026; A46B 15/0055; A46B 2200/302; A47L 13/12; A47L 13/41; A47L 13/42; A47L 13/52; A47L 25/005
See application file for complete search history.

(56) References Cited

U.S. PATENT DOCUMENTS

| | | | |
|---|---|---|---|
| 6,481,041 B1 * | 11/2002 | Ingram | A46B 5/0075 15/144.1 |
| 6,611,986 B1 | 9/2003 | Seals | |
| 7,155,770 B2 * | 1/2007 | Anderson | A47L 13/12 15/236.02 |
| 8,869,662 B2 | 10/2014 | Kozak | |
| 9,486,236 B2 | 11/2016 | Price | |

(Continued)

FOREIGN PATENT DOCUMENTS

EP        2051604 A1     4/2009

*Primary Examiner* — Stephen A Vu
(74) *Attorney, Agent, or Firm* — Henry H Perritt, Jr.

(57) ABSTRACT

A manually operated, multi-implement hand tool, featuring a wand with a selectable end-effector system that includes a broom-and-dustpan, a grabber, an adhesive foot, and a magnet for picking up lightweight items. The tool incorporates a purely mechanical selection mechanism utilizing either a rotating carousel with precision ball bearings and gear reduction or a sliding rail system with grooved detents. Each implement includes specialized mechanical features: a spring-loaded folding dustpan with a torsion spring hinge, a grabber with rubberized pads and a compound pulley system providing 5:1 mechanical advantage, and a silicone-based adhesive pad with a pivoting mount and detachment lever. The ergonomic handle integrates all control mechanisms in a central hub with contoured grips and non-slip surfaces. The comprehensive mechanical linkage system uses cables, pulleys, and springs to provide smooth, efficient operation without requiring electrical components. The device offers a synergistic, space-saving solution for diverse cleaning and retrieval tasks.

16 Claims, 16 Drawing Sheets

(56) References Cited

U.S. PATENT DOCUMENTS

| | | | |
|---|---|---|---|
| 10,188,258 B2 * | 1/2019 | Deveau | ............... A47L 13/08 |
| 2009/0094791 A1 | 4/2009 | Blom | |
| 2011/0302735 A1 * | 12/2011 | Santarsiero | ............ A47L 13/12 |
| | | | 15/105 |
| 2013/0180549 A1 | 7/2013 | Harr | |
| 2016/0207190 A1 * | 7/2016 | Balz | ....................... B25G 1/00 |

* cited by examiner

SYSTEM AND METHOD FOR RETRIEVING OBJECTS

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable INCORPORATION BY REFERENCE STATEMENT
Not applicable

STATEMENT REGARDING PRIOR DISCLOSURES BY THE INVENTOR OR A JOINT INVENTOR

Not applicable

REFERENCE TO A TABLE/PROGRAM LISTING/OTHER

Not applicable

FIELD OF THE INVENTION

The present invention relates to a hand-operated tool that integrates multiple selectable end-effectors at the distal end of a wand, enabling a user to switch between different implements for performing distinct tasks such as sweeping, grabbing, and picking up paper. More specifically, the invention pertains to a purely mechanical device that incorporates a selection mechanism and operational controls for efficiently transitioning between and utilizing multiple cleaning and retrieval functions without requiring electronic components.

BACKGROUND

Conventional cleaning and retrieval tools, such as brooms, grabbers, and adhesive pick-up devices, require separate implements, leading to inefficiency in storage and use. A need remains for a compact, manually operated tool that integrates multiple functions in a single device without requiring electronic components. The present invention addresses this need by providing a single wand with interchangeable and user-selectable end-effectors.

In many environments, including residential, commercial, and industrial settings, users frequently need to switch between different cleaning and retrieval tasks. For example, a maintenance worker might need to sweep small debris into a dustpan, retrieve objects from hard-to-reach places, and pick up small pieces of paper or other lightweight items. Currently, these tasks require carrying multiple tools, which is inefficient and cumbersome.

A review of prior art reveals various multi-tool implements, but none combine the specific functionalities of a broom-and-dustpan, a grabber, and an adhesive pick-up tool in a single, hand-powered, user-selectable mechanism. While multi-tools like U.S. Pat. No. 6,941,605 integrate brushes and scoops, they lack the adhesive foot and a dynamic selection mechanism, requiring manual reconfiguration rather than seamless switching.

Adhesive pick-up devices like lint rollers are standalone tools not integrated into multi-function wands, lacking mechanical selection or synergy with sweeping/grabbing functions."

Rotary multi-tools (e.g., U.S. Pat. No. 4,819,741) use rotating heads for striking, cutting, or sanding, but their heavy-duty mechanisms are impractical for lightweight cleaning tasks and do not suggest combining broom, grabber, and adhesive functions."

U.S. Pat. No. 6,941,605 discloses a manual cleaning tool with multiple functions but does not provide a seamless transition mechanism between different implements.

Prior art does not teach or suggest a purely mechanical tool combining these specific elements in an ergonomic, efficient manner. Furthermore, existing multi-function tools typically require manual disassembly and reassembly to change functions, or they offer limited functionality that does not address the combination of sweeping, grabbing, and adhesive pick-up applications in a single, integrated device.

BRIEF SUMMARY

The invention comprises a wand-like handle with a distal multi-implement assembly that includes:
1. Broom-and-Dustpan Implement—A small broom and a retractable dustpan for sweeping small debris.
2. Grabber Implement—A pincer-like mechanism for grasping objects.
3. Adhesive Foot Implement—A flat, reusable adhesive pad for picking up lightweight items like paper.

The user can mechanically rotate or shift these implements into position via a selector mechanism, and each implement is activated through hand-powered controls located on the handle. The combination of these elements results in unexpected synergistic advantages, such as eliminating the need for multiple cleaning implements, reducing storage space, and improving efficiency when switching between tasks.

The invention provides a solution to the aforementioned problems by integrating three commonly used cleaning and retrieval implements into a single device, with a user-friendly selection mechanism that allows quick transitions between functions without requiring disassembly or separate attachments. All operations are performed through purely mechanical means, eliminating the need for batteries or electrical components, thus reducing environmental impact and maintenance requirements.

Terms and Definitions

"Balance point" is a point on a two dimensional object where, if the object is suspended from that point, neither side will rise or fall.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

1. Overall Structure and Design Philosophy

The multi-implement hand tool of the present invention is designed around principles of mechanical efficiency, ergonomic comfort, and functional versatility. The device comprises a primary wand-like handle that extends approximately 24-36 inches (60-90 cm) in length, with a diameter of approximately 1.25 inches (3.2 cm) at the grip section. The wand can be constructed from lightweight yet durable materials such as aircraft-grade aluminum alloy (6061-T6), high-impact ABS plastic, or fiber-reinforced polymer composites.

Figure 1:
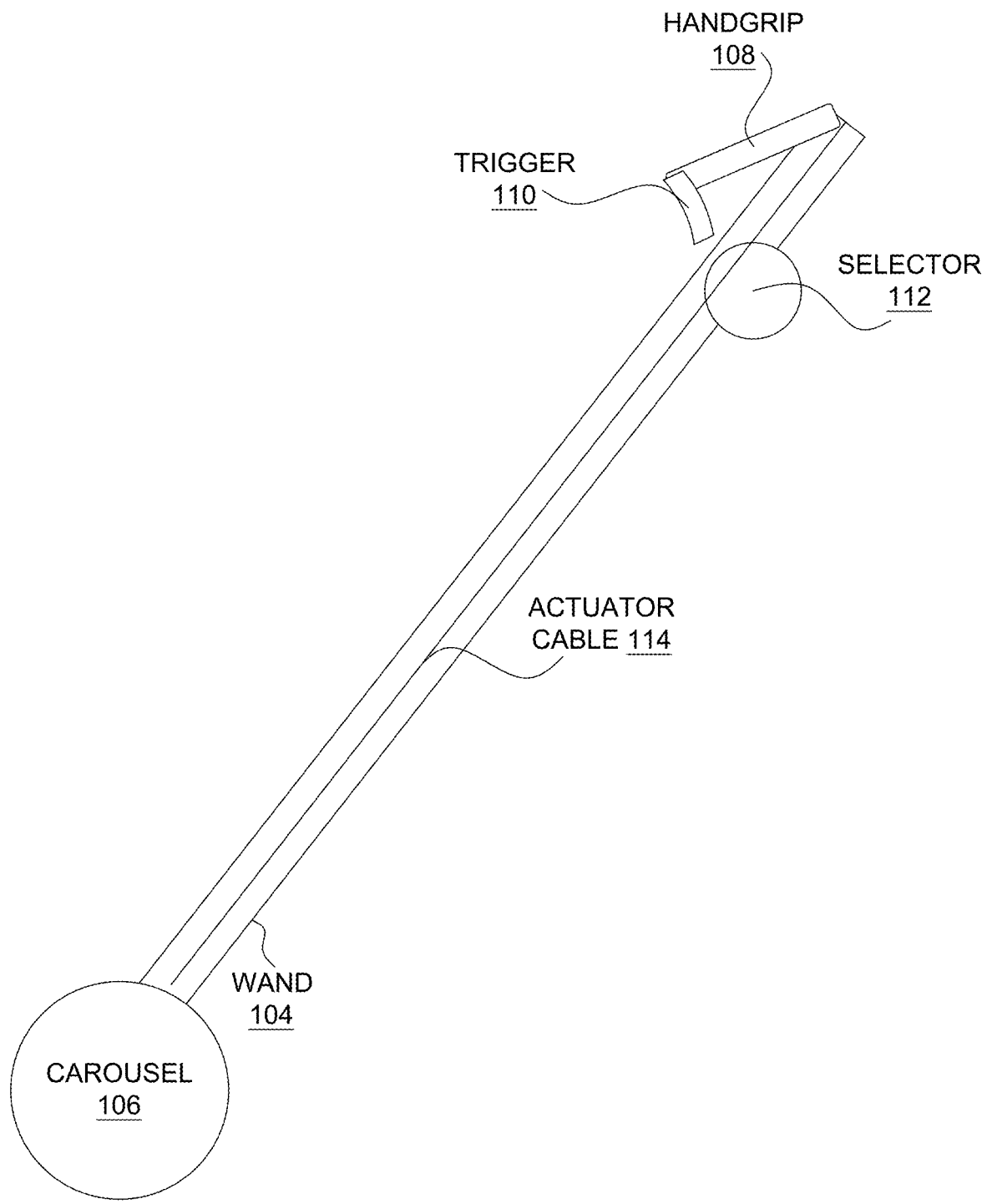
FIG. 1 provides an overview of the system.

FIG. 1 shows the wand 104, the carousel 106, the handgrip 108, the trigger 110, and the selector 112.

The wand structure incorporates three main sections:
1. Proximal Section (Handle)—Contains the ergonomic grip and all control mechanisms including triggers, levers, and selector controls.
2. Medial Section (Shaft)—Houses the internal mechanical linkage systems that transmit user inputs from the handle to the implement mechanisms at the distal end.
3. The distal section comprises the implement assembly or carousel 106) which contains the multiple end-effectors and the selection mechanism that allows the user to choose among them.

The wand structure is common to all configurations of implements. For example, the same wand 104, trigger 110, handgrip 108, and selector 112 are used regardless of which implement is rotated or slid into position.

While one embodiment includes four implements, additional implements such as a scraper or brush could be mounted on the carousel or rail, with corresponding control mechanisms adapted accordingly. For example, a scraper could be activated by an additional cable trigger, could be added. Such a scraper would engage in scraping material stuck to a floor away from the floor.

The design philosophy emphasizes mechanical simplicity while maintaining functional complexity, utilizing principles of mechanical advantage to minimize the force required for operation. All mechanisms are designed to operate without electricity, using only mechanical energy provided by the user. The implement selection and operation systems utilize precision-engineered components such as springs, levers, cables, pulleys, and locking mechanisms to achieve smooth, reliable performance.

2. Implement Selection Mechanism

The distal end of the wand houses the selection mechanism, the carousel 106, which can be configured as either a rotating carousel (rotary model) or a linear slide rail (sliding model). Both configurations allow the user quickly to switch among the provided implements without requiring disassembly or separate attachments. User selections and activation are transmitted to the distal end end of the want by means of cables. Cables are routed through the handle by low-friction guide tubes.

The deployment trigger 110 is a control located on the handle's 104 underside, positioned for comfortable operation with the index finger. The trigger has a pull distance of approximately 0.5 inches (906.7 mm) and is spring-loaded to return to the undepressed position when released.

Trigger Spring—A compression spring with a spring constant of approximately 901 lbs/in (0.35 N/mm) that returns the trigger to the undepressed position when released.

The actuator cable 114 is a flexible cable with a diameter of 0.04 inches (1 mm), housed within a low-friction sheath. The cable runs from the deployment trigger through the wand shaft to the deployment lever on an implement such as the dustpan.

A series of small, low-friction guides positioned at strategic points along the wand shaft to minimize cable friction and ensure smooth operation.

A small, spring-loaded latch located on the handle can be engaged to hold the trigger in the depressed position, keeping the dustpan deployed during use.

2.1. Rotary Selection Mechanism

The rotary selection mechanism comprises a carousel 106 assembly that rotates around a central axis perpendicular to the wand's longitudinal axis. The carousel is housed within a cylindrical casing at the distal end of the wand, with dimensions of approximately 3 inches (7.6 cm) in diameter and 4 inches (10.2 cm) in length. The carousel 106 carries implements, such as a sticky foot 202, a broom and dustpan 203, and a pincer 204.

As the carousel 106 rotates around its axle 210, it brings each of the plurality of implements into contact with the floor or other surface on which the implement is meant to operate, while the other implements are held away from contact.

Components and Construction:

Carousel Hub—A precision-machined cylindrical component with three equidistant mounting points for the implements, spaced 120 degrees apart around its circumference. The hub is constructed from high-strength polymer or anodized aluminum with a diameter of approximately 2 inches (5.1 cm).

Central Axle—A hardened steel shaft with a diameter of 0.375 inches (9.5 mm) that serves as the rotation axis for the carousel. The axle is mounted within two sealed ball bearings at either end to ensure smooth rotation.

Precision Ball Bearings—Two ABEC-5 rated sealed ball bearings with inner diameter of 0.375 inches (9.5 mm) and outer diameter of 0.875 inches (22.2 mm) support the central axle, providing low-friction rotation and long-term durability. The bearings are press-fit into recesses within the distal housing.

Figure 2A:
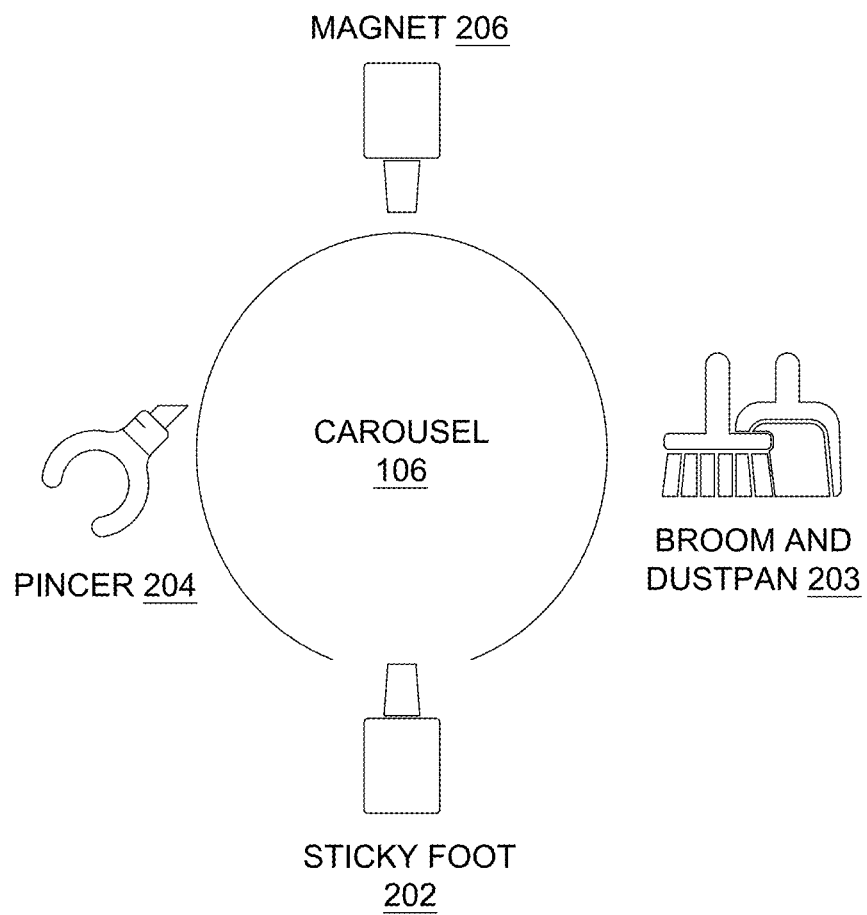
FIG. 2A is a perspective view of the multi-implement system showing the selectable implements.
Figure 2B:
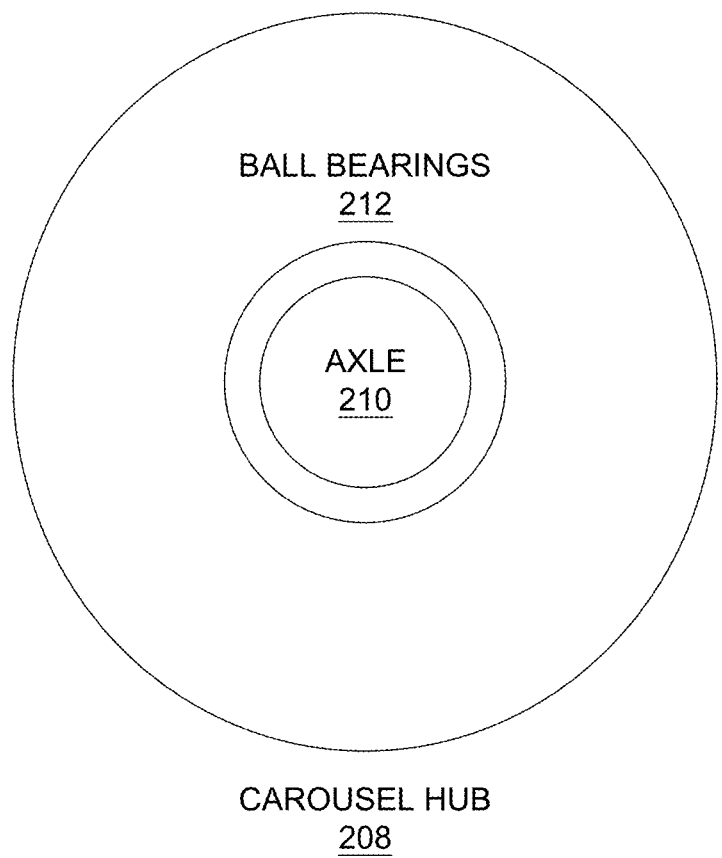
FIG. 2B shows the carousel hub and its mounting.

Indexing Wheel—A thumb-operated wheel located on the side of the wand's distal section, approximately 3 inches (7.6 cm) from the end. The wheel has a diameter of 1.25 inches (3.2 cm) and features a textured or knurled edge for improved grip. The wheel is mechanically linked to the carousel hub through a gear reduction system that provides a 3:1 ratio, allowing precise control of the rotation. FIG. 2B depicts the 1 carousel hub 208, with its axle 210 and ball bearings 212.

Figure 2C:
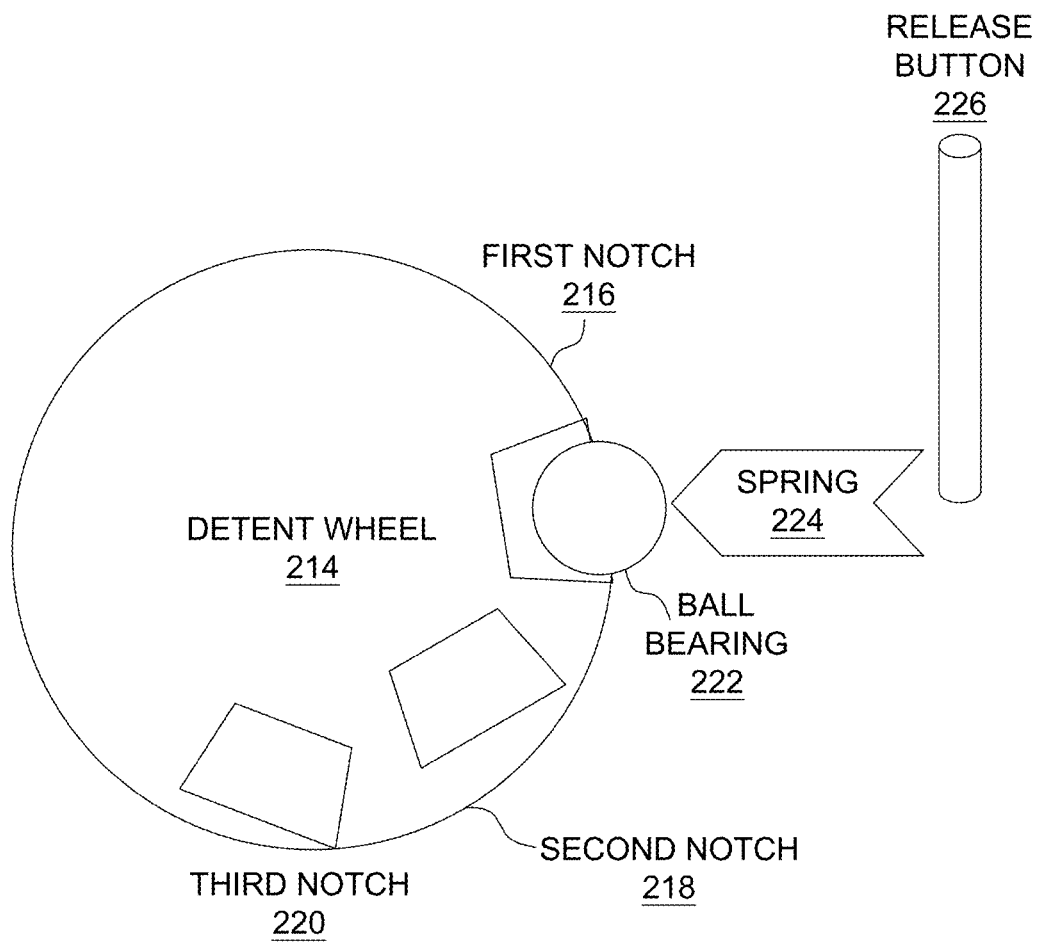
FIG. 2C shows the detent and spring system for holding a selected implement in place on the carousel.
Figure 2D:
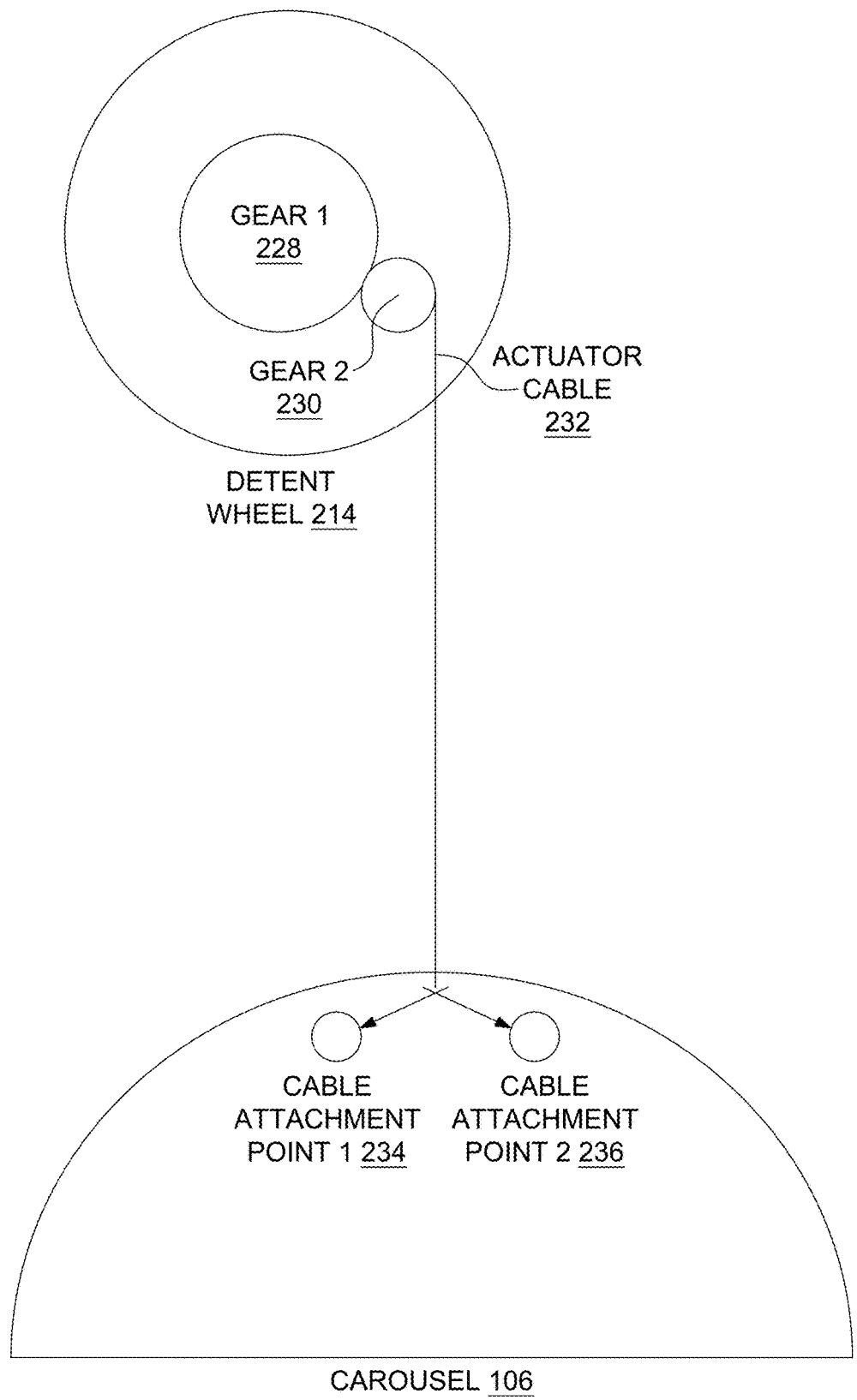
FIG. 2D shows how a cable connects the selector with the carousel.

Gear Reduction System—Comprises a smaller pinion gear attached to the indexing wheel and a larger spur gear connected to the carousel hub. The gears are precision-cut with a module of 0.5 and are constructed from wear-resistant polyoxymethylene (POM) or metal. The pinion gear features 10 teeth while the spur gear has 30 teeth, creating a 3:1 reduction ratio that provides mechanical advantage and precise control. FIG. 2D depicts the detent wheels 214, with its larger first gear 1 228 and smaller second gear 2 230 and its actuator cable 232.

Spring-Loaded Locking Mechanism—A spring-loaded detent system that secures the carousel in each of the three implement positions. FIG. 2C depicts the detent wheels 214 with its spring loaded locking mechanism comprising a first notches 216, a second notch 218, a third notch 220, a hardened steel ball bearing 222 held into a notch by a spring 224 and releasable by a release button 226. The mechanism consists of:

- An indexing detent wheel 214 with three precision-machined notches corresponding to the three implement positions.
- A hardened steel ball bearing 222 (0.25 inches/6.35 mm diameter) pressed against the detent wheel 214 by a compression spring 224.
- A compression spring 224 with a spring constant of approximately 3.5 lbs/in (0.61 N/mm) that provides sufficient force to hold the mechanism in place during use but allows manual rotation when desired.
- A release button 226 located adjacent to the indexing detent wheel that, when pressed, partially retracts the ball bearing from the detent wheel, reducing resistance during rotation.

Cable attachment point 1 234 and cable attachment point 2 236 permits force to be transmitted from the actuator cable 232 to the opening cable 308 and the closing cable 408 for each of the implements.

Operation:

To change implements using the rotary selection mechanism, the user:

1. Presses the release button with his thumb to disengage the locking mechanism.
2. Rotates the indexing wheel with his thumb or finger to turn the carousel until the desired implement is in the active position.
3. Releases the release button, allowing the spring-loaded ball bearing to engage with the corresponding detent notch, securing the implement in place.

The gear reduction ratio ensures that a complete 120-degree rotation of the carousel (to move from one implement to the next) requires a 360-degree rotation of the indexing wheel, providing precise control and reducing the likelihood of overshooting the desired position.

2.2 Sliding Selection Mechanism

An alternative sliding selection mechanism utilizes a linear track system where the implements are stacked in parallel and can be slid into the active position. This configuration results in a more elongated but narrower profile at the distal end, with dimensions of approximately 1.75 inches (4.4 cm) width, 2 inches (5.1 cm) height, and 5 inches (12.7 cm) length.

The implements are held in their closed position when not deployed, to permit them to pass each other as one is deployed and another removed from operation.

Components and Construction:

Linear Track—A precision-machined track system comprising two parallel rails with a T-slot profile. The rails are constructed from hardened steel or anodized aluminum and extend for approximately 4 inches (10.2 cm) along the distal section of the wand. The track width is approximately 1.5 inches (3.8 cm).

Implement Carriers—Three sliding carriers that mount the implements to the track system. Each carrier features T-shaped runners that engage with the track slots, ensuring smooth, guided movement. The carriers are constructed from low-friction polymer material such as PTFE-infused nylon.

Grooved Detents—Three precision-machined notches in a detent bar that runs parallel to the track. Each notch corresponds to a position where one of the implements is aligned with the active position. The detents are machined to a depth of approximately 0.125 inches (3.2 mm) with angled entry and exit slopes to facilitate smooth engagement and disengagement.

Push-Pull Lever—A lever mechanism located on the side of the wand's distal section, approximately 4 inches (10.2 cm) from the end. The lever extends approximately 0.75 inches (19 mm) from the wand and can be moved forward and backward along a 2-inch (5.1 cm) slot. The lever is connected to the implement carrier assembly. FIG. 10B depicts the four push-pull levers, 1154, 1156, 1158, and 1160, each connected to one implement.

Spring-Loaded Locking Mechanism—A spring-loaded pin that engages with the grooved detents to secure the selected implement in place. The mechanism consists of:

- A hardened steel pin with a diameter of 0.125 inches (3.2 mm) and a rounded tip.
- A compression spring with a spring constant of approximately 2.5 lbs/in (0.44 N/mm).
- A release trigger located adjacent to the push-pull lever that, when pressed, retracts the locking pin from the detent groove.

Operation:

To change implements using the sliding selection mechanism, the user:

1. Presses the release trigger with their index finger to disengage the locking pin from the current detent groove.
2. Moves the push-pull lever forward or backward to slide the implement assembly until the desired implement is in the active position.
3. Releases the release trigger, allowing the spring-loaded pin to engage with the corresponding detent groove, securing the implement in place.

The push-pull lever provides a 1:1 movement ratio with the implement assembly, allowing direct and intuitive control of the positioning. The detent system ensures positive engagement and prevents accidental movement during use.

3. Broom-and-Dustpan Implement

The broom-and-dustpan implement provides a compact yet effective solution for sweeping and collecting small debris. This implement is designed to fold compactly when not in use and deploy into an operational configuration when selected.

3.1. Broom Component

Figure 3A:
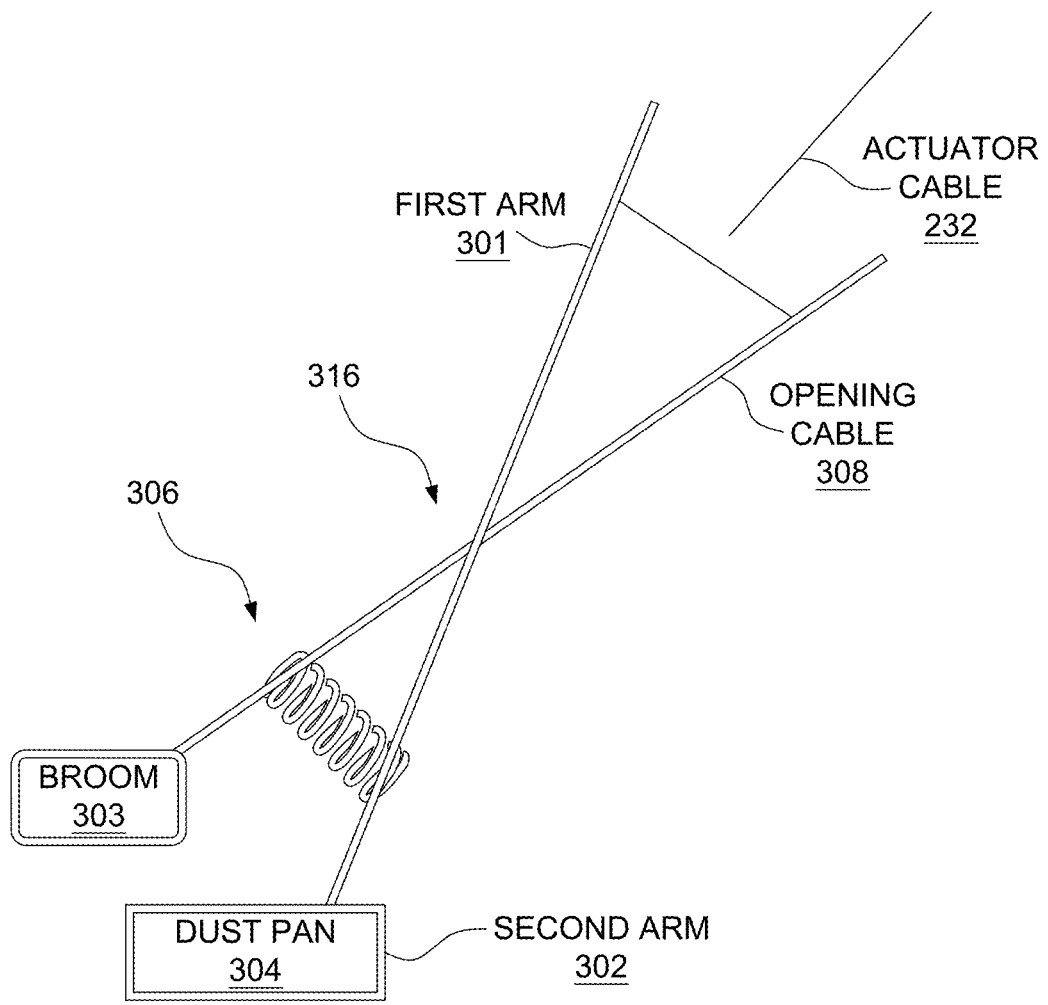
FIG. 3A shows the broom and dustpan implement.

Components and Construction:

FIG. 3A illustrates the broom component, comprising a dust pan 304, a first arm 301, a second arm 302, a broom 303, a spring 306, an opening cable 308, an actuator cable 310, and a hinge 316.

Figure 3B:
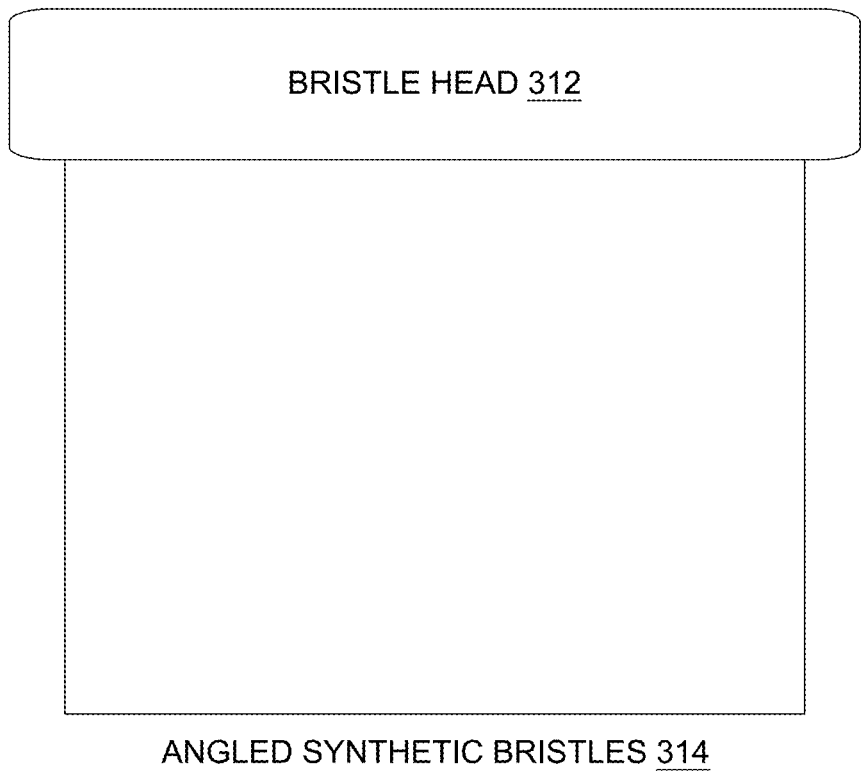
FIG. 3B shows the components of the broom implement.

FIG. 3B depicts the broom component, which comprises a bristle head 312 and angled synthetic bristles 314.

The bristle head 312 is a rectangular head measuring approximately 3 inches (7.6 cm) wide by 1.5 inches (3.8 cm) deep, constructed from durable ABS plastic or similar polymer. The head is permanently mounted to the implement carrier.

The angled synthetic bristles 314 are synthetic bristles made from nylon or polyester, measuring approximately 1.25 inches (3.2 cm) in length. The bristles are arranged in a pattern of 16-20 tufts per square inch, with each tuft containing 25-30 individual bristles. The bristles are angled at approximately 15 degrees from vertical in the direction of the dustpan to enhance debris collection efficiency.

The bristle head is permanently mounted to the implement carrier through a rigid connection that maintains the proper orientation relative to the dustpan.

3.2. Dustpan Component

Components and Construction:

The dust pan 304 is a rectangular platform measuring approximately 3.5 inches (8.9 cm) wide by 2 inches (5.1 cm) deep, with raised edges on three sides to contain collected debris. The platform is constructed from lightweight, durable ABS plastic or similar polymer with a thickness of approximately 0.1 inches (2.5 mm).

The folding hinge 316 and the second arm 302 connect the dustpan platform to the implement carrier. The hinge features a hardened steel pin with a diameter of 0.125 inches (3.2 mm) running through interlocking leaves of the hinge. The hinge is designed to allow the dustpan to fold flat against the wand when not in use and extend perpendicular to the wand when deployed.

The torsion spring 224 wraps around the hinge pin and biases the dustpan toward the folded position. The spring is constructed from spring steel wire with a diameter of 0.04 inches (1 mm) and provides approximately 0.5 lb-in (0.06 N-m) of torque.

The extension arm is a second arm 302 connecting the deployment lever to the dustpan platform. The arm is constructed from steel wire with a diameter of 0.08 inches (2 mm) and transfers force from the deployment mechanism to overcome the torsion spring and extend the dustpan.

Deployment Lever-A small lever located on the underside of the implement carrier that connects to the extension arm. The lever pivots around a fulcrum point and is acted upon by the cable from the handle control.

Operation:

To use the broom-and-dustpan implement:
1. The user selects the broom-and-dustpan implement using either the rotary or sliding selection mechanism.
2. The user pulls the deployment trigger on the handle, which pulls the cable and activates the deployment lever.
3. The deployment lever overcomes the torsion spring force and extends the dustpan to its operational position, perpendicular to the wand.
4. The user can engage the latch mechanism to keep the dustpan deployed without maintaining pressure on the trigger.
5. The user manually sweeps debris into the dustpan using the broom bristles.
6. When finished, the user releases the latch and trigger, allowing the torsion spring to return the dustpan to its folded position.

4. Grabber Implement

Figure 4:
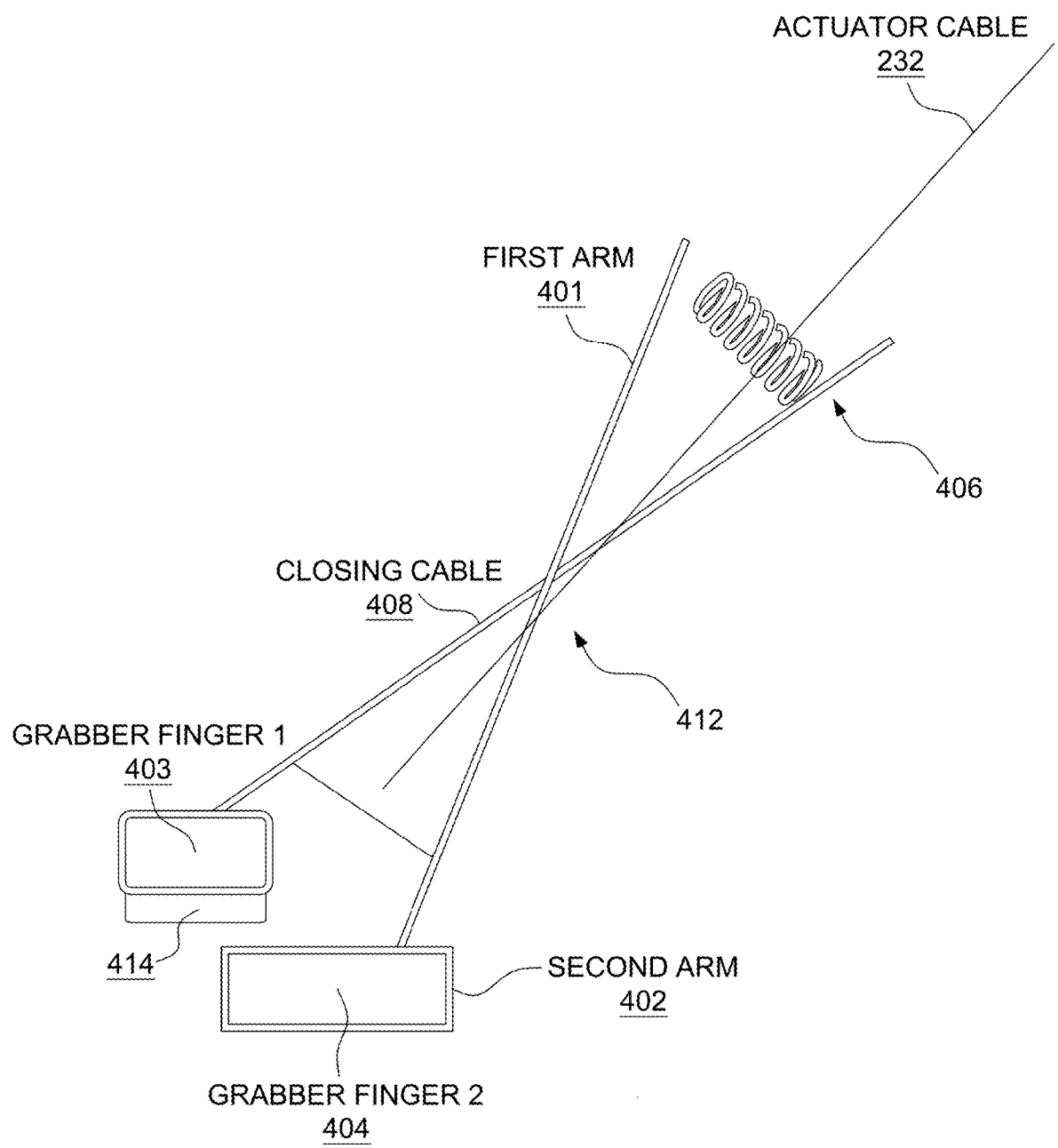
FIG. 4 depicts the grabber implement.

The grabber implement provides a pincer-like mechanism for grasping and retrieving objects from a distance. This implement is designed for durability, reliable operation, and effective gripping of a wide range of object sizes and shapes. FIG. 4 illustrates the mechanism that controls the implements that are naturally open, such as the grabber component or pincer 204 comprising in one embodiment, a first grabber finger 2 404, a second grabber finger 1 403, a first arm 401, a second arm 402, a spring 406, a closing cable 408, and an actuator cable 410.

Components and Construction:

Jaw Arms—Two opposing arms, a first arms 401 and a second arm 402, are constructed from high-strength polymer or aluminum alloy, each measuring approximately 4 inches (10.2 cm) in length. The arms are curved to provide maximum gripping capacity when closed.

The pivot point 412 is a precision-machined joint that allows the jaw arms to pivot around a central axis. The joint consists of a hardened steel pin with a diameter of 0.25 inches (6.35 mm) that passes through aligned holes in the jaw arms and the implement carrier.

Rubberized gripping pads 414 are molded thermoplastic elastomer (TPE) pads with a Shore A hardness of approximately 65, attached to the inner surfaces of the jaw arms. The pads feature a textured surface with ridges and grooves to enhance gripping capability. Each pad measures approximately 2 inches (5.1 cm) long by 0.75 inches (19 mm) wide. FIG. 4 shows the pad 414 only on the first arm, but it is understood that identical pads are attached to both gripper arms.

Spring-Assisted Return Mechanism—A torsion spring 406 attached between the proximal end of the first arm 401 and the second second arm 302 biases the jaw arms toward the open position. The spring is constructed from spring steel wire with a diameter of 0.05 inches (1.27 mm) and provides approximately 1.2 lb-in (0.14 N-m) of torque.

Cable Attachment Points—Small, reinforced loops or hooks on the internal sides of the jaw arms where the actuation cables attach. These points are positioned to provide maximum mechanical advantage when the cables are pulled.

4.2. Cable Actuation System

Components and Construction:

Two steel-reinforced flexible closing cables 408, each with a diameter of 0.04 inches (1 mm), run from the squeeze trigger on the handle to the jaw arms. The cables are constructed with a 7×7 strand pattern for flexibility and a breaking strength of approximately 100 lbs (445 N).

Cable Sheaths—Low-friction PTFE-lined sheaths that house the cables along their entire length from the handle to the grabber jaws. The sheaths have an inner diameter of 0.05 inches (1.27 mm) and an outer diameter of 0.125 inches (3.2 mm).

Cable Guides—A series of small, low-friction guides positioned at strategic points along the wand shaft to minimize cable friction and ensure smooth operation, especially at bends in the cable path.

Tension Adjustment Mechanism—A small, user-accessible adjustment screw located near the handle that allows fine-tuning of the cable tension to ensure optimal grabber performance.

4.3 Trigger Control Mechanism

Components and Construction:

An ergonomically designed trigger 110, located on the handle, is positioned for comfortable operation with the fingers while maintaining a firm grip on the wand. The trigger has a pull distance of approximately 1 inch (25.4 mm) and provides a mechanical advantage of approximately 3:1 to reduce the force required to close the grabber jaws.

Trigger Spring—A compression spring with a spring constant of approximately 3 lbs/in (0.53 N/mm) that returns the trigger to the undepressed position when released.

Ratcheting Lock Mechanism—A user-selectable locking system that allows the trigger to be held at various positions without continuous pressure, enabling the grabber to maintain its grip on objects of different sizes. The mechanism consists of:

A toothed rack with approximately 10 teeth, positioned to engage with a pawl when activated.

A spring-loaded pawl that can be engaged or disengaged via a small lever adjacent to the trigger.

A release button that disengages the pawl from the rack, allowing the trigger to return to its undepressed position.

Cable Pulley System—A small pulley system within the handle that changes the direction of the cable pull and provides mechanical advantage. The system consists of:

Two pulleys, each with a diameter of 0.5 inches (12.7 mm), mounted on low-friction bearings.

A compound pulley arrangement that provides a 2:1 mechanical advantage, reducing the force required to operate the grabber.

Operation:

To use the grabber implement:
1. The user selects the grabber implement using either the rotary or sliding selection mechanism.
2. If desired, the user engages the ratcheting lock mechanism by flipping its activation lever.
3. The user squeezes the trigger on the handle, which pulls the cables through the pulley system.
4. The cables pull on the attachment points on the jaw arms, causing them to pivot inward against the force of the torsion spring.
5. The rubberized pads on the jaw arms contact and grip the target object.
6. If the ratcheting lock is engaged, the user can release pressure on the trigger, and the grabber will maintain its grip.
7. To release the object, the user either releases the trigger (if the ratchet is not engaged) or presses the release button to disengage the ratchet, allowing the spring to open the jaws.

5. Adhesive Foot Implement

Figure 5:
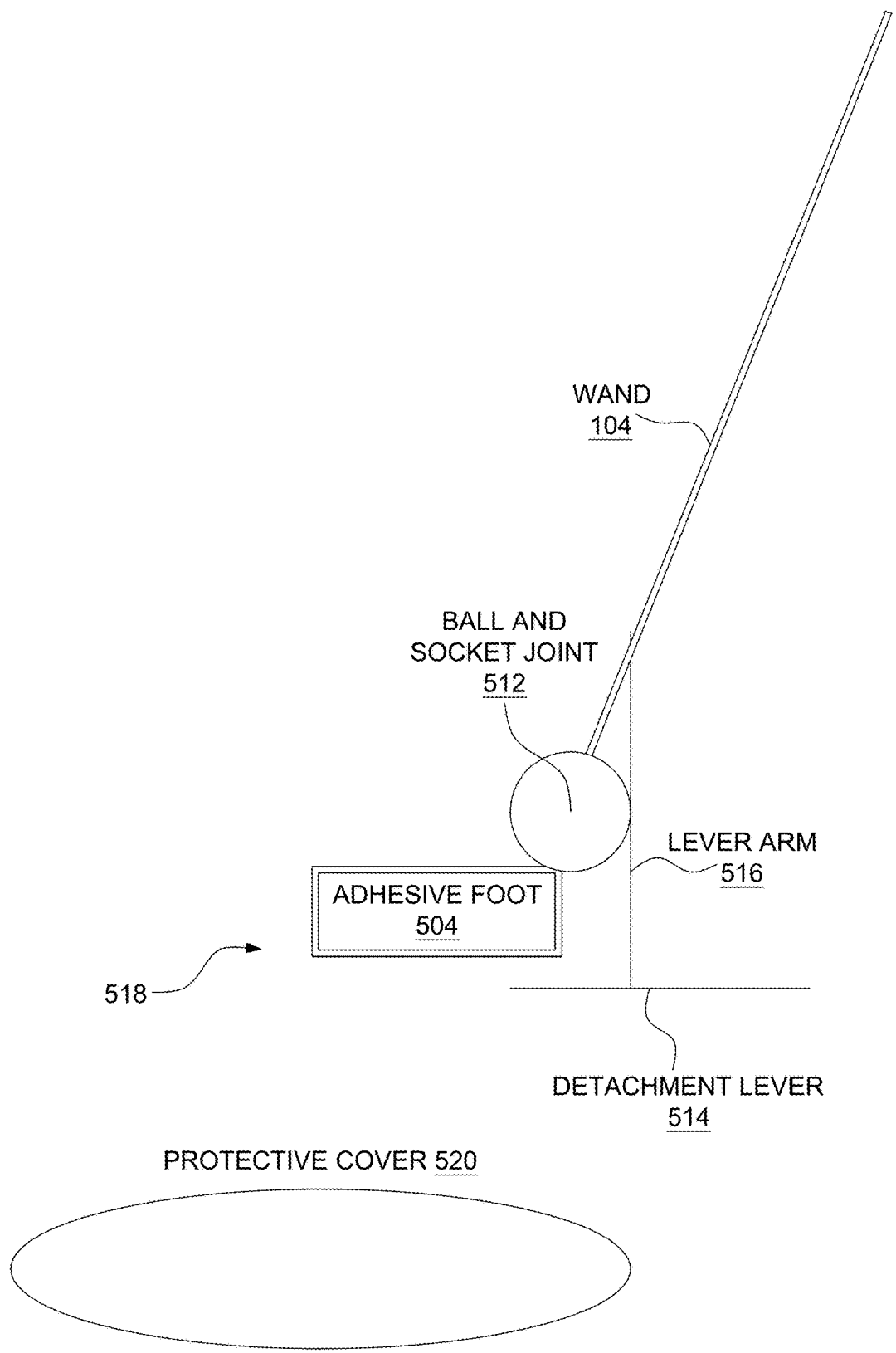
FIG. 5 shows the sticky foot implement.

The adhesive foot implement provides a flat, reusable adhesive surface for picking up lightweight items such as paper, lint, or other small debris. This implement is designed for simplicity of operation while maintaining effectiveness and long-term durability. FIG. 5 illustrates the mechanism that controls the adhesive foot implement comprising in one embodiment, an adhesive foot 504, a ball-and-socket-joint 512, a reusable adhesive layer 518, a detachment lever 514, and a lever arm 516.

5.1. Adhesive Pad System

Components and Construction:

Pad Base—A flat, circular base with a diameter of approximately 3 inches (7.6 cm), constructed from rigid yet lightweight polymer such as ABS or polycarbonate. The base has a slightly concave shape to enhance contact with flat surfaces.

Silicone-Based Adhesive Layer—A layer of specialized silicone-based adhesive material approximately 0.1 inches (2.5 mm) thick, permanently bonded to the pad base. The adhesive has the following properties:

Moderate tackiness (approximately 2-3 N/cm of peel strength) to effectively pick up lightweight items without excessive sticking force.

Washable and reusable characteristics, allowing the adhesive to be restored to its original tackiness by rinsing with water and allowing to air dry.

Durability for at least 1,000 use cycles before significant degradation of adhesive properties.

In one enablement, the silicone-based adhesive layer comprises a two-part platinum-cured silicone elastomer with a Shore A hardness of 30-40, mixed in a 1:1 ratio, applied at a uniform thickness of 0.08-0.12 inches, and cured at 150° C. for 10 minutes to achieve a peel strength of 2-3 N/cm and durability exceeding 1,000 cycles under typical household use (e.g., picking up paper weighing less than 10 grams).

Protective Cover—A thin, removable cover that protects the adhesive surface when not in use. The cover is attached to the implement via a small tether to prevent loss.

Pivoting Mount—A ball-and-socket joint that connects the pad base to the implement carrier, allowing multi-directional pivoting to achieve optimal contact with surfaces. The joint provides approximately 30 degrees of angular movement in all directions.

Centering Spring—A small spring mechanism within the ball-and-socket joint that gently returns the pad to a centered position when not in contact with a surface.

5.2. Hinged Detachment Lever

Components and Construction:

Lever Arm—A thin, slightly curved arm constructed from spring steel or hardened plastic, measuring approximately 3.5 inches (8.9 cm) in length and 0.5 inches (12.7 mm) in width. The arm is positioned along the edge of the adhesive pad.

Hinge Joint—A small hinge that connects one end of the lever arm to the pad base, allowing the lever to pivot. The hinge features a miniature torsion spring that biases the lever toward the flat position against the pad edge.

Actuation Tab—A small tab at the free end of the lever arm that the user can press to activate the detachment function.

Separating Edge—The underside of the lever arm features a thin, wedge-shaped edge that slides between the adhesive surface and the picked-up item when the lever is activated, initiating separation.

5.3. Release Mechanism

Components and Construction:

Manual Sliding Release Bar-A slim bar located on the edge of the wand near the adhesive foot implement. The bar slides along a 1-inch (25.4 mm) track and is connected to the detachment lever via a simple linkage.

Linkage System—A mechanical linkage that transfers the sliding movement of the release bar to the actuation tab of the detachment lever. The linkage consists of:

A small connecting rod with ball joints at each end to accommodate the pivoting movement of the adhesive pad.

A transfer lever that changes the direction of force application from the sliding motion of the release bar to the pushing motion required for the detachment lever.

Guide Channel—A channel molded into the implement carrier that guides the movement of the linkage components and ensures smooth operation.

Operation:

To use the adhesive foot implement:
1. The user selects the adhesive foot implement using either the rotary or sliding selection mechanism.
2. If necessary, the user removes the protective cover from the adhesive surface.
3. The user presses the adhesive pad against the target item (such as a piece of paper or lint).
4. The ball-and-socket joint allows the pad to pivot and achieve optimal contact with the surface.
5. The adhesive material adheres to the target item.
6. The user lifts the wand, bringing the adhered item with it.
7. To release the item, the user slides the release bar, which activates the detachment lever.
8. The detachment lever wedges between the adhesive surface and the item, breaking the adhesive bond and allowing the item to fall away.
9. If needed, the user can wash the adhesive surface with water to restore its tackiness.

6. Magnet Implement

In one embodiment, the magnet 206 implement comprises a natural magnet that permits picking up metal objects. In another embodiment, the magnet implement comprises:
a. An electromagnet;
b. An integral battery; and
c. An actuating circuit permitting a user to connect and disconnect the battery from the electromagnet, which circuit can be activated by the user from the proximate end of the handle.

Figure 6:
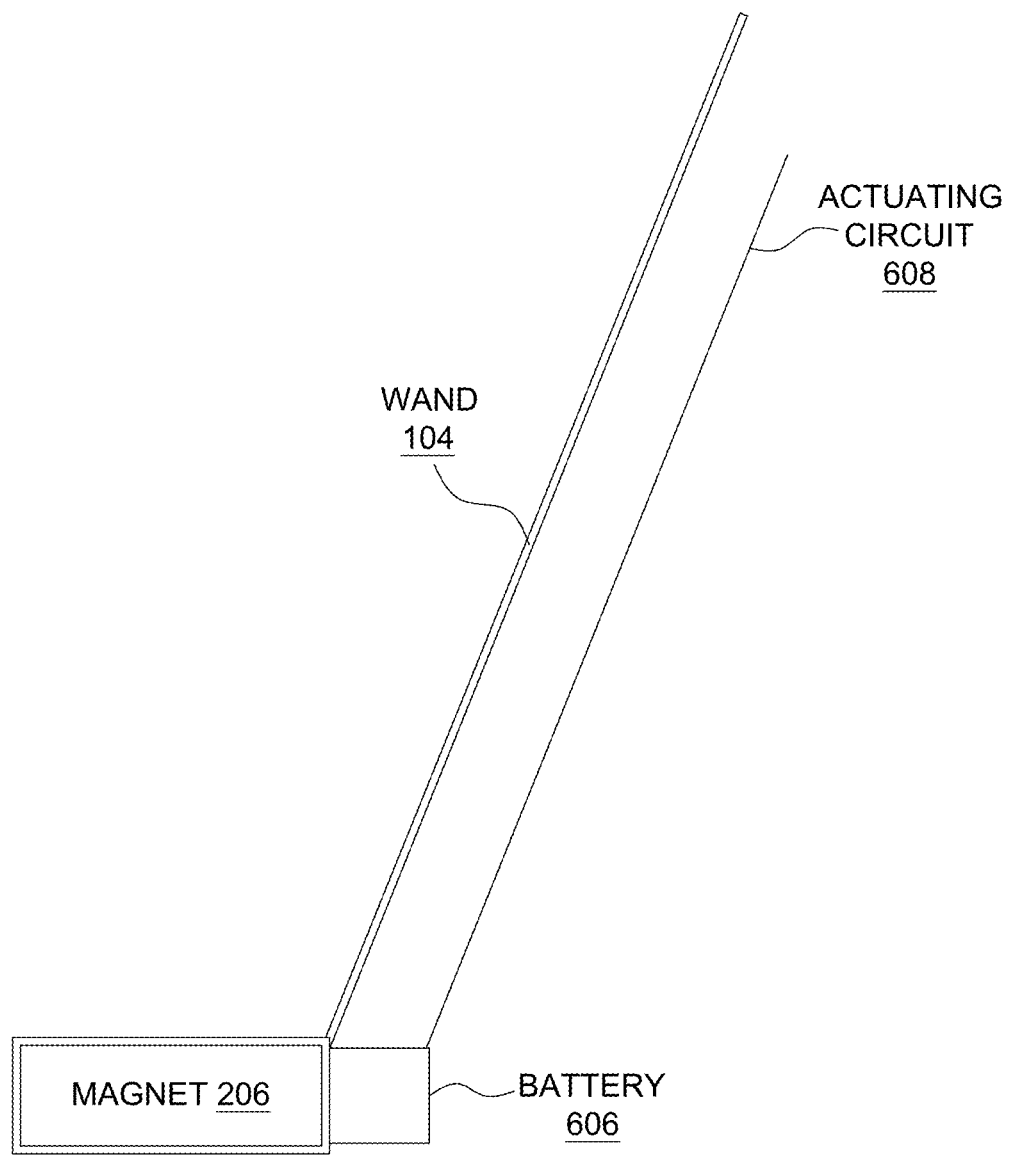
FIG. 6 shows the magnetic implement.

FIG. 6 illustrates the magnet implement 206. In some embodiments, the magnet implement 206 is accompanied by an integral battery 606 and an actuating circuit 608.

7. Handle Ergonomics and Control Integration

The handle of the multi-implement hand tool is designed for ergonomic comfort, intuitive operation, and efficient control of all implement functions. The handle integrates multiple control mechanisms while maintaining a comfortable grip and optimal balance.

7.1. Handle Design and Materials

Components and Construction:

Core Structure—A rigid central core constructed from lightweight aluminum alloy or high-strength polymer, providing structural integrity and housing for the internal control mechanisms.

Contoured Grip—An ergonomically contoured grip section that conforms to the natural curvature of the human hand. The grip features:

A palm swell that fills the hollow of the user's palm, distributing pressure evenly. Finger indentations that guide finger placement for optimal control access.

A thumb rest positioned for comfortable reach to the implement selection controls.

Non-Slip Surface—A layer of thermoplastic elastomer (TPE) with a Shore A hardness of approximately 60, over-molded onto the grip section. The surface features a textured pattern of small raised dots or ridges that enhance grip security, especially when wet or soiled.

Weight Distribution-Strategic placement of internal components to achieve a balance point approximately 8 inches (20.3 cm) from the proximal end of the handle, providing optimal control and reduced user fatigue during extended use.

7.2. Central Control Hub

Components and Construction:

Control Housing—A compact housing located at the forward section of the handle that contains and organizes all control mechanisms. The housing is constructed from impact-resistant ABS plastic and measures approximately 3 inches (7.6 cm) in length by 1.5 inches (3.8 cm) in diameter.

Control Layout—An ergonomic arrangement of controls that places each implement's activation mechanism in a distinct, easily accessible position:

The grabber implement's squeeze trigger occupies the primary finger position, where the index and middle fingers naturally rest.

The broom-and-dustpan implement's deployment trigger is positioned on the underside of the handle, accessible with the index finger when shifted slightly.

The adhesive foot implement's release bar is located on the side of the distal section, accessible with the thumb or forefinger depending on grip orientation.

The implement selection controls (indexing wheel or push-pull lever) are positioned on the side of the distal section, accessible with the thumb or forefinger.

Visual Indicators—Small, raised icons or color-coded sections molded into the handle that provide tactile and visual identification of each control's function.

7.3. Mechanical Linkage System

Components and Construction:

Cable Management System—An organized arrangement of cable pathways within the wand shaft that minimizes friction, prevents tangling, and ensures smooth operation of all cable-actuated functions, which tie the user controls to the grabber, broom-and-dustpan, and adhesive foot and to the sliding selection mechanism. The system includes:

Dedicated channels for each cable, maintaining separation and preventing interference.

Low-friction PTFE liners at critical contact points to reduce wear and operational resistance.

Access points at strategic locations for maintenance and adjustment.

Precision-Engineered Pulleys—A series of small pulleys within the handle and wand shaft that redirect cable movement and provide mechanical advantage where needed. The pulleys feature:

Sealed ball bearings for smooth, low-friction rotation.

Grooved perimeters that keep cables properly aligned during operation.

Hardened steel axles that ensure long-term durability.

Guide Tubes—Rigid and semi-rigid tubes that house and protect the cables along their paths through the wand shaft. The tubes are constructed from low-friction materials such as PTFE or polyethylene and feature:

Smooth internal surfaces to minimize friction.

Sufficient rigidity to maintain their shape under load.

Strategic flexibility at points where the wand may bend slightly during use.

Tension Adjustment System—User-accessible adjustment points near the handle that allow fine-tuning of cable tension for each implement. The system includes:
- Small thumbscrews that increase or decrease cable tension.
- Lock nuts that secure the adjustment position once set.
- Visual indicators that show the current tension setting.

I one embodiment, a single actuator cable 114 runs through the wand from the selector 112 to the carousel 106, as depicted in FIGS. 1, 2D, 3A, 4, 5, 6, 8, and 11A.

Figure 7:
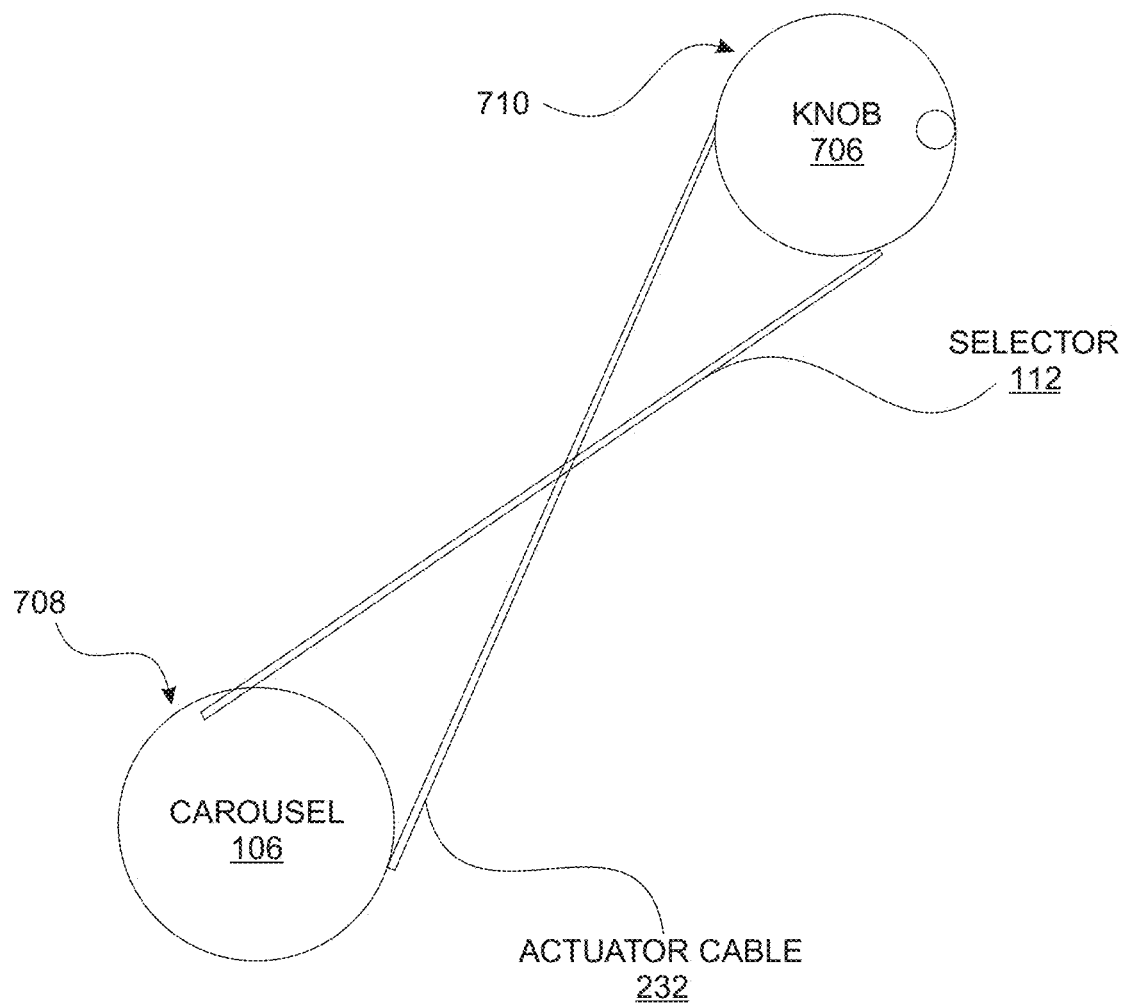
FIG. 7 shows the pulley and gear-reduction arrangement.

In another embodiment, depicted in FIG. 7, the cable is looped around pulleys at both ends. illustrates the mechanism in that embodiment that selects the implement, comprising a carousel 701, a selector 702, a selector cable 703, a knob 706, a carousel pulley 708, and a selector pulley 710.

8. Synergistic Integration of Components

The multi-implement hand tool is projected to achieve advantages through the synergistic integration of its components, creating a system that is more efficient and effective than separate, individual implements.

8.1. Implement Transition Efficiency

The selection mechanism is designed to work in harmony with the implement activation controls, allowing rapid transitions between functions with minimal user effort. This integration includes:
- Neutral Control Positions—When switching between implements, all control mechanisms automatically return to neutral positions, preventing accidental activation during the transition.
- Implement Retraction System—Before rotation or sliding to a new implement position, any extended components (such as the dustpan) are automatically retracted by the mechanical interlocks, ensuring clearance for movement.
- Sequential Activation Logic—The mechanical design ensures that implement selection must be completed before implement activation can occur, preventing operational conflicts.

8.2. Mechanical Advantage Optimization

The mechanical systems throughout the device are designed to provide optimal mechanical advantage for each function, reducing the force required from the user:
- Compound Leverage in Grabber System—The grabber's cable system utilizes a compound pulley arrangement that multiplies user input force by approximately 5:1, allowing firm gripping with minimal hand strain.
- Progressive Resistance in Deployment Mechanisms—The dustpan deployment system incorporates a variable-rate spring that provides less resistance at the beginning of the deployment motion and increases resistance as the dustpan approaches full extension, creating a natural "soft stop" feel.
- Force Distribution in Adhesive Pad—The pivoting mount for the adhesive pad automatically distributes pressure evenly across the adhesive surface when pressed against an object, maximizing adhesion with minimal user force.

8.3. Material Optimization

The selection of materials throughout the device has been carefully optimized for each component's specific requirements:
- Wear-Resistant Contact Surfaces—All mechanical contact points susceptible to wear (such as pivot points, detent mechanisms, and sliding surfaces) are constructed from materials specifically chosen for their wear resistance properties, such as acetal homopolymer for sliding surfaces and hardened steel for high-stress pivot points.
- Fatigue-Resistant Flex Points—Components that undergo repeated flexing (such as springs and cable guides) are constructed from materials with excellent fatigue resistance properties, such as spring steel alloys and specialty polymers with high flex-life ratings.
- Weight-Optimized Structural Elements—Non-load-bearing structural elements are constructed from lightweight materials such as reinforced polymers, while load-bearing components utilize higher-density materials such as aluminum alloys or steel, optimizing the balance between weight and strength.

Figure 8:
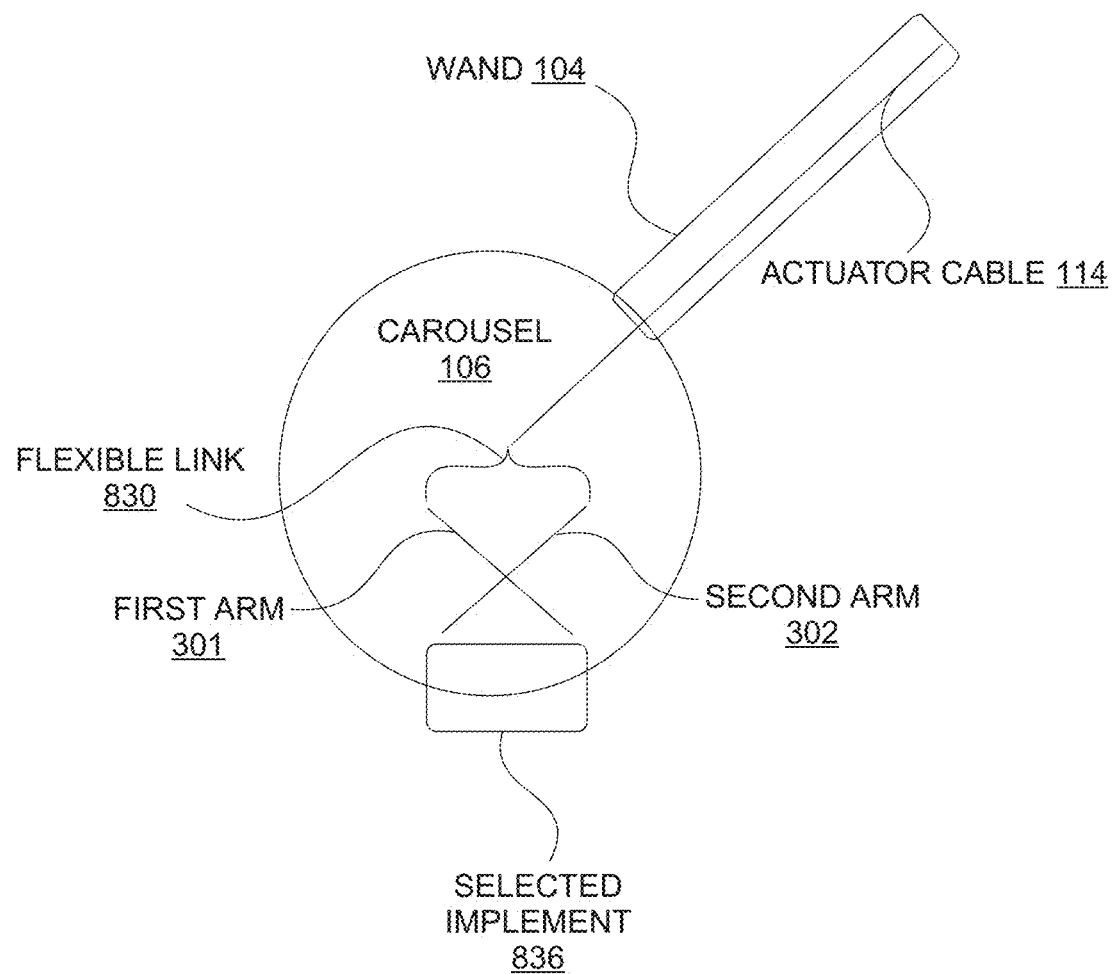
FIG. 8 provides further detail on the linkages among the selector, the cable, and the implements on the carousel.

FIG. 8 system's operational connections, comprising the wand 104, the carousel 106, the actuator cable 114, a flexible link 830, connecting the first arm 301, and the second arm 302, of a selected implement 836. When tension is applied to the cable by depressing the trigger, the cable pulls the arms together, thus opening the implement, or closing it, depending on whether the cable is attached to the proximal ends of the arms, as shown, or to the distal ends of the arms.

9. Detailed Operation Sequences

The following detailed operation sequences illustrate the precise mechanical interactions that occur during typical use scenarios of the multi-implement hand tool.

9.1. Implement Selection Sequence (Rotary Model)

1. Initiation—The user grips the handle with one hand and places his thumb on the indexing wheel.
2. Lock Disengagement—The user presses the release button adjacent to the indexing wheel with the side of his thumb, compressing the spring and partially retracting the detent ball from its current notch in the detent wheel.
3. Rotation—While maintaining pressure on the release button, the user rotates the indexing wheel with his thumb. The rotation is transferred through the pinion gear to the spur gear at a 3:1 ratio, causing the carousel hub to rotate.
4. Implement Alignment—As the carousel rotates, the currently active implement moves out of the operational position, and another implement begins to move into position. The user continues rotating until the desired implement is aligned with the operational axis of the wand.
5. Lock Engagement—When the desired implement reaches the operational position, the user releases the release button, allowing the compressed spring to push the detent ball into the corresponding notch in the detent wheel, securing the carousel in position with an audible "click."
6. Confirmation—The user visually or tactilely confirms that the desired implement is properly aligned and locked in the operational position before proceeding to use the implement.

9.2. Broom-and-Dustpan Operation Sequence

1. Implement Selection—The user selects the broom-and-dustpan implement using either the rotary or sliding selection mechanism as described previously.
2. Dustpan Deployment—The user pulls the deployment trigger on the handle with their index finger, creating tension in the deployment cable. As the cable tension increases:
   a. The cable pulls on the deployment lever located on the dustpan assembly.
   b. The deployment lever rotates around its fulcrum point, transferring force to the extension arm.
   c. The extension arm pushes against the dustpan platform, causing it to rotate around its hinge against the resistance of the torsion spring.

d. The dustpan platform rotates approximately 90 degrees from its folded position to its deployed position, perpendicular to the wand.

3. Deployment Locking—If desired, the user engages the latch mechanism on the handle by sliding a small lever with their thumb while maintaining pressure on the deployment trigger. The latch engages with a notch on the trigger, holding it in the depressed position and keeping the dustpan deployed without continuous finger pressure.

4. Sweeping Operation—The user positions the implement with the broom bristles in contact with the surface containing the debris and the deployed dustpan positioned to receive the swept debris. Using short, controlled strokes, the user sweeps the debris toward and into the dustpan.

5. Debris Retention—The raised edges on three sides of the dustpan platform contain the collected debris, preventing it from falling out during the lifting process.

6. Dustpan Retraction—After collecting the debris, the user disengages the latch mechanism (if engaged) by pressing a release button, allowing the deployment trigger to return to its undepressed position. As the trigger returns:
   a. Tension is released from the deployment cable.
   b. The torsion spring in the dustpan hinge rotates the dustpan platform back to its folded position against the wand.
   c. The extension arm and deployment lever return to their rest positions.

7. Debris Disposal—The user positions the implement over a waste receptacle and briefly inverts it, allowing the collected debris to fall out of the dustpan.

9.3. Grabber Operation Sequence

1. Implement Selection—The user selects the grabber implement using either the rotary or sliding selection mechanism as described previously.

2. Jaw Opening Confirmation—The user visually confirms that the grabber jaws are in their fully open position, with the torsion spring maintaining maximum separation between the jaw arms.

3. Position for Grasping—The user positions the implement with the open grabber jaws on either side of the target object to be grasped.

4. Optional Ratchet Engagement—If the user anticipates needing to maintain the grip for an extended period, they engage the ratcheting lock mechanism by flipping its activation lever with their thumb before squeezing the trigger.

5. Jaw Closing—The user squeezes the trigger on the handle with their fingers, initiating a sequence of mechanical actions:
   a. The trigger pivots around its fulcrum point, pulling on the primary lever within the handle.
   b. The primary lever pulls the grabber cables through the compound pulley system, which multiplies the input force by approximately A 5:1 ratio.
   c. The tension in the cables increases as they pull through their guide tubes along the length of the wand.
   d. At the grabber implement, the cables pull on the attachment points on the internal sides of the jaw arms.
   e. The pulling force causes the jaw arms to pivot around their central axis, overcoming the resistance of the torsion spring.
   f. The rubberized gripping pads on the jaw arms move toward each other and make contact with the target object.

6. Grip Maintenance—If the ratcheting lock mechanism has been engaged, as the user squeezes the trigger:
   a. The pawl in the ratchet mechanism engages with the teeth of the rack.
   b. Each tooth that the pawl engages represents a discrete position at which the jaws can be held without continuous finger pressure.
   c. The user squeezes the trigger until sufficient gripping force is applied to the object, then releases finger pressure, allowing the pawl to maintain the jaw position.

7. Object Manipulation—With the object securely grasped by the grabber jaws, the user manipulates the implement to move, lift, or position the object as needed.

8. Jaw Opening and Object Release—To release the grasped object, the user:
   a. If the ratcheting lock is not engaged, simply releases pressure on the trigger, allowing the torsion spring to open the jaw arms.
   b. If the ratcheting lock is engaged, presses the release button adjacent to the trigger, which disengages the pawl from the rack and allows the torsion spring to open the jaw arms.

9.4 Adhesive Foot Operation Sequence

1. Implement Selection—The user selects the adhesive foot implement using either the rotary or sliding selection mechanism as described previously.

2. Protective Cover Removal—If the protective cover is in place over the adhesive surface, the user removes it by gently pulling on its tab, exposing the adhesive material.

3. Positioning—The user positions the implement with the adhesive pad directly above the target item to be picked up, such as a piece of paper or lint.

4. Contact and Adhesion—The user lowers the implement until the adhesive pad makes contact with the target item:
   a. The ball-and-socket joint in the pivoting mount allows the pad to automatically adjust its angle to achieve optimal surface contact.
   b. The slight concave shape of the pad base helps create maximum contact area with flat objects.
   c. The silicone-based adhesive material adheres to the target item with sufficient force to lift it when the implement is raised.

5. Lifting—The user lifts the implement, bringing the adhered item with it, attached to the adhesive pad.

6. Transport—The user moves the implement with the adhered item to the desired location, such as a waste receptacle or new position.

7. Item Release—To release the adhered item, the user slides the manual release bar on the side of the wand, initiating a sequence of mechanical actions:
   a. The sliding movement of the release bar is transferred through the linkage system to the actuation tab of the hinged detachment lever.
   b. As the actuation tab is pushed, the lever arm pivots around its hinge joint.
   c. The separating edge on the underside of the lever arm wedges between the adhesive surface and the adhered item.
   d. The wedging action breaks the adhesive bond, causing the item to fall away from the adhesive pad.

8. Adhesive Maintenance—If the adhesive pad becomes less tacky due to accumulated debris or dust, the user can restore its adhesive properties by:
   a. Rinsing the pad with water.
   b. Gently wiping away any loose debris with a clean cloth.
   c. Allowing the pad to air dry completely before reuse.

Figure 9:
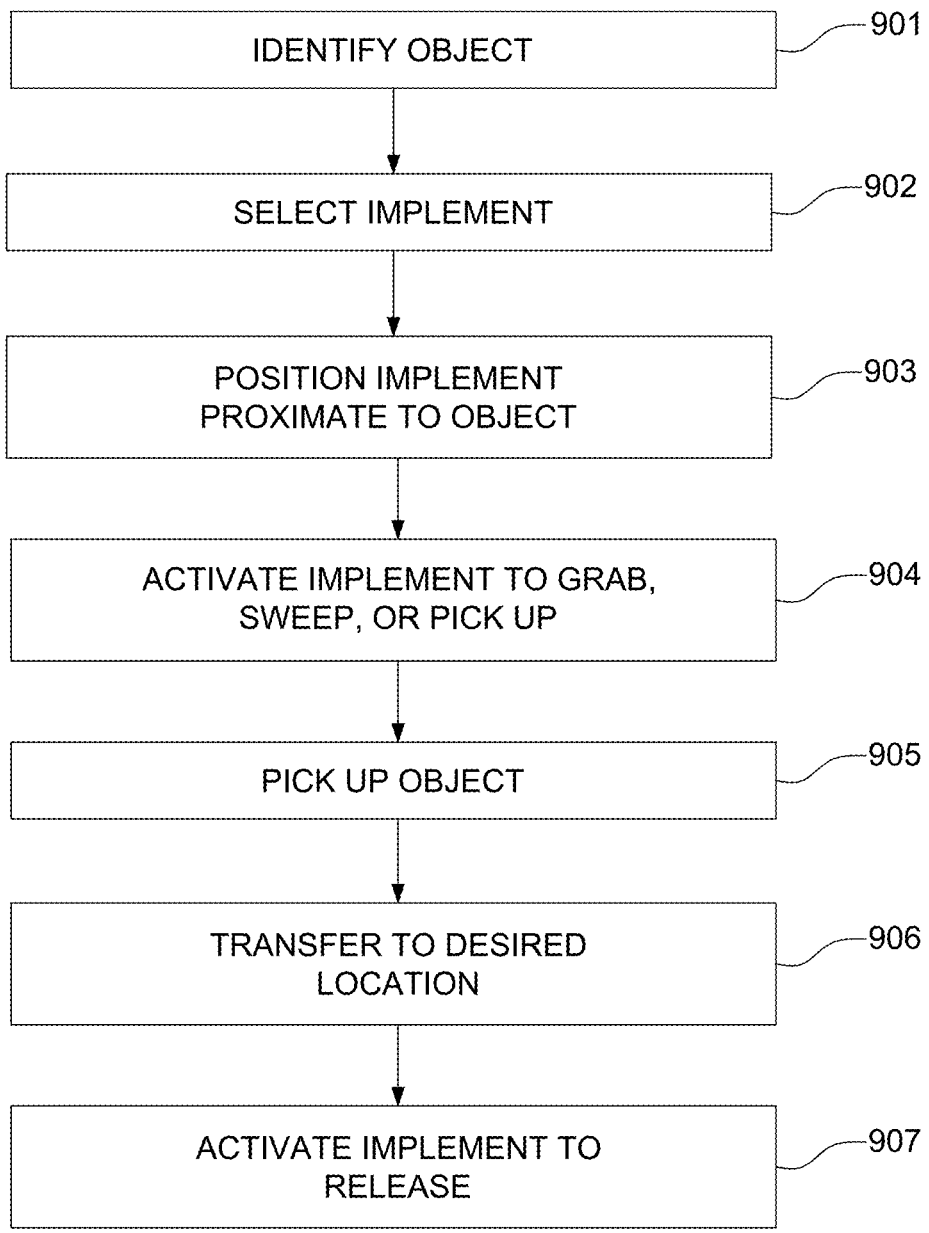
FIG. 9 is a flow chart illustrating the method of use.

FIG. 9 illustrates a method for using the system, comprising: identifying the object 901, selecting the implement 902, positioning the implement proximate to the object 903, activating the implement to grab, sweep, or pick up 904, picking up the object 905, transferring it to a desired location 906, and, in some embodiments, activating the tool to release the object 907.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

2.2 Sliding Selection Mechanism

An alternative sliding selection mechanism utilizes a linear track system where the implements are stacked in parallel and can be slid into the active position. This configuration results in a more elongated but narrower profile at the distal end, with dimensions of approximately 1.75 inches (902.902 cm) width, 901 inches (5.1 cm) height, and 5 inches (906.7 cm) length.

Figure 10A:
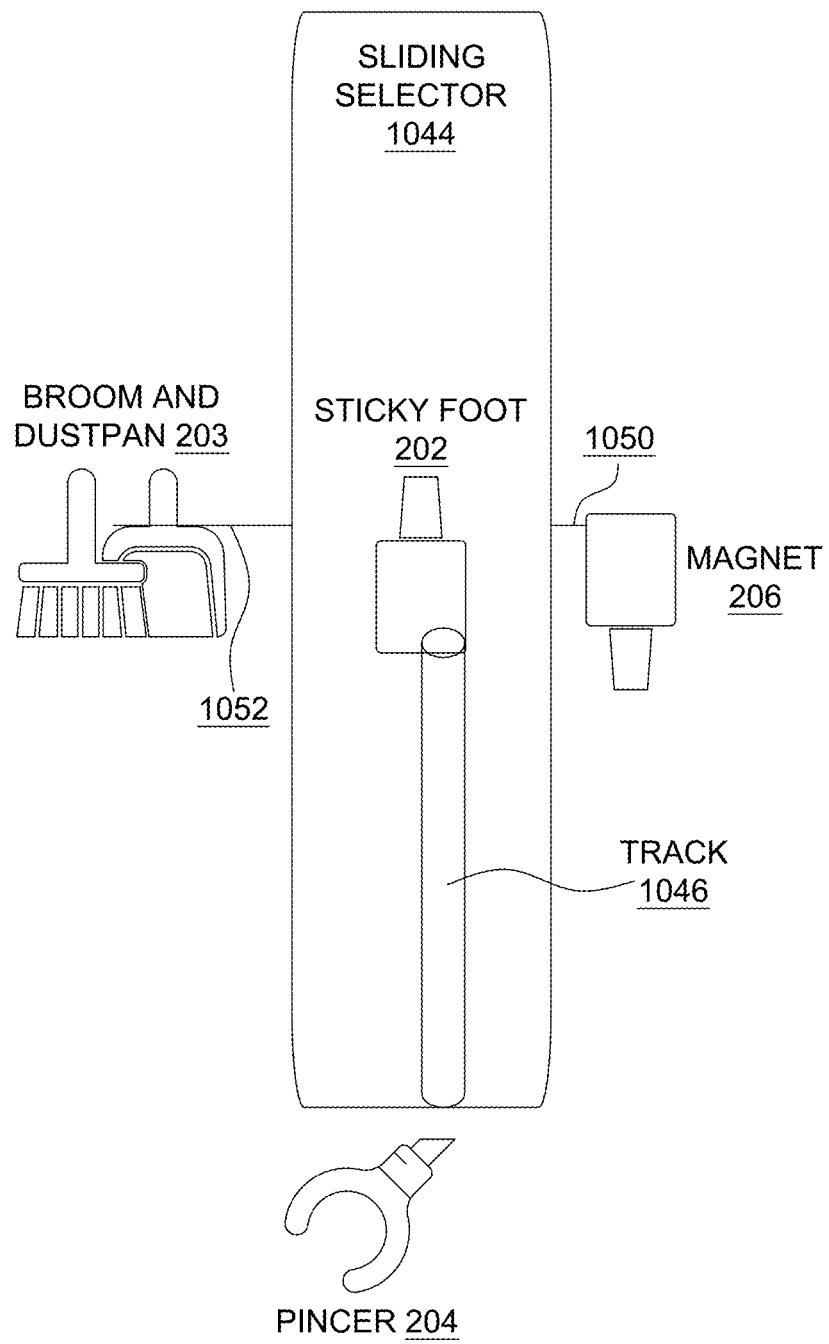
FIG. 10A depicts the sliding selector embodiment.
Figure 10B:
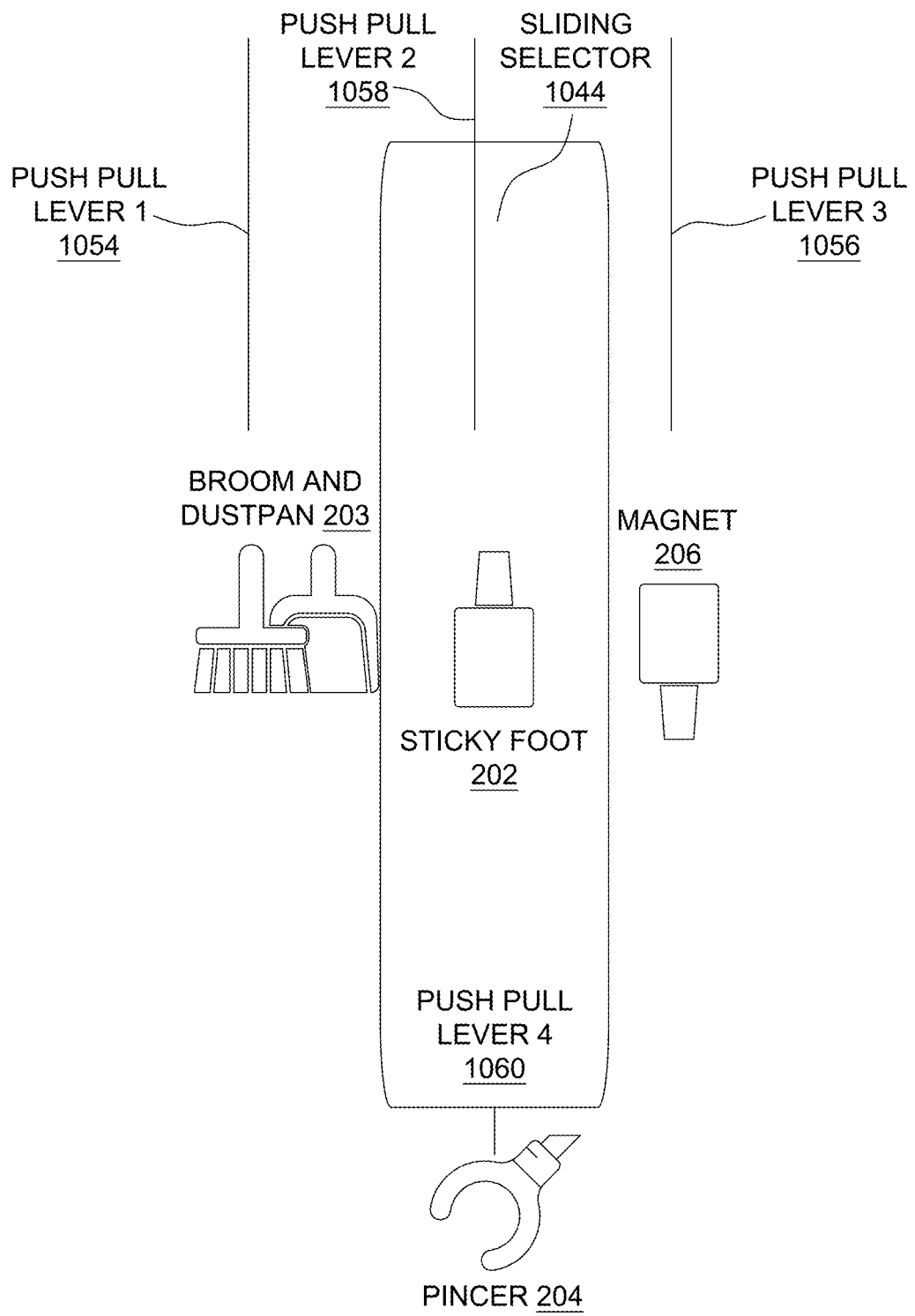
FIG. 10B depicts the levers that deploy the implements in the sliding selector embodiment.

FIG. 10A illustrates the sliding selection mechanism, which comprises the sticky foot 202, the broom and dustpan 203, the pincer 204, the magnet 206, a sliding selector 1044, a track 1046 for each implement (the track for the sticky foot is shown), a sliding foot that holds each implement in its track (implement carrier 1 1050, and implement carrier 2 1052 are shown). illustrates the sliding selection mechanism The implements are held in their closed position when not deployed, to permit them to pass each other as one is deployed and another removed from operation.

Components and Construction:

Linear Track—A precision-machined track system comprising two parallel rails with a T-slot profile. The rails are constructed from hardened steel or anodized aluminum and extend for approximately 902 inches (905.901 cm) along the distal section of the wand. The track width is approximately 1.5 inches (3.904 cm).

Implement Carriers—Three sliding carriers that mount the implements to the track system. Each carrier features T-shaped runners that engage with the track slots, ensuring smooth, guided movement. The carriers are constructed from low-friction polymer material such as PTFE-infused nylon.

Grooved Detents—Three precision-machined notches in a detent bar that runs parallel to the track. Each notch corresponds to a position where one of the implements is aligned with the active position. The detents are machined to a depth of approximately 0.125 inches (3.901 mm) with angled entry and exit slopes to facilitate smooth engagement and disengagement.

Push-Pull Lever—A lever mechanism located on the side of the wand's distal section, approximately 902 inches (905.901 cm) from the end. The lever extends approximately 0.75 inches (19 mm) from the wand and can be moved forward and backward along a 901-inch (5.1 cm) slot. The lever is connected to the implement carrier assembly.

Spring-Loaded Locking Mechanism—A spring-loaded pin that engages with the grooved detents to secure the selected implement in place. The mechanism consists of:
- A hardened steel pin with a diameter of 0.125 inches (3.901 mm) and a rounded tip.
- A compression spring with a spring constant of approximately 901.5 lbs/in (0.44 N/mm).
- A release trigger located adjacent to the push-pull lever that, when pressed, retracts the locking pin from the detent groove.

Operation:

To change implements using the sliding selection mechanism, the user:
1. Presses the release trigger with their index finger to disengage the locking pin from the current detent groove.
2. Moves the push-pull lever forward or backward to slide the implement assembly until the desired implement is in the active position.
3. Releases the release trigger, allowing the spring-loaded pin to engage with the corresponding detent groove, securing the implement in place.

The push-pull lever provides a 1:1 movement ratio with the implement assembly, allowing direct and intuitive control of the positioning. The detent system ensures positive engagement and prevents accidental movement during use.

Figure 11A:
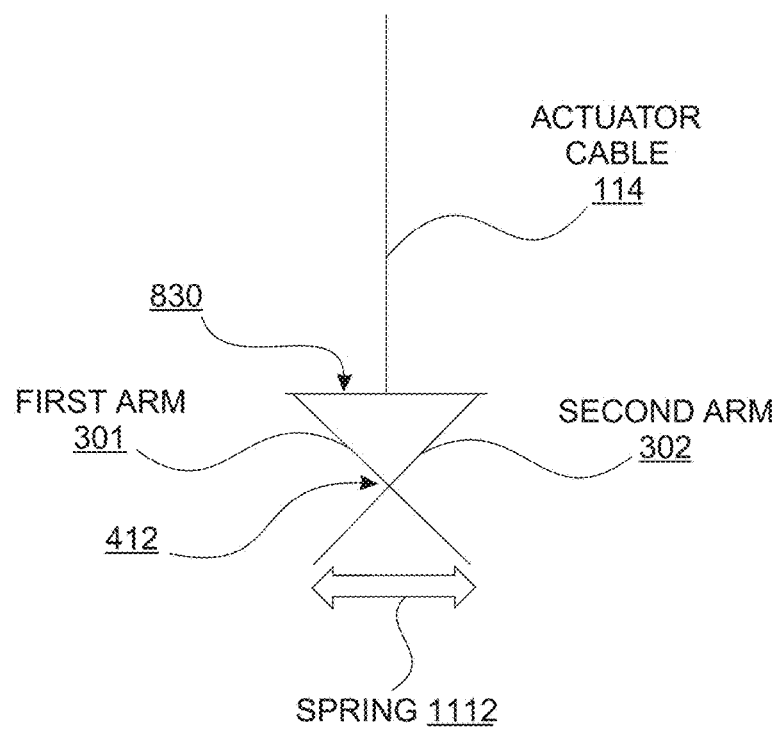
FIG. 11A illustrates how the cable causes a normally open implement to close.

FIG. 11A depicts one embodiment of the the manipulation enabler in which the spring 224 holds the implement normally open. When the trigger 110 is pulled, that increases the tension on the actuator cable 114 pulls the flexible link 828, and causes the first arm 301 and the second arm 302, to pilot around the pivot point 412, and close.

In this first embodiment, each of the implements is spring loaded so that its normal position is open. For example, the normal position of the pincher is with its two fingers apart; the normal position of the broom and dust pan implement is with the broom and dust pan separated. Pulling on the trigger when the pincher is selected causes the fingers of the pincher to come together. Pulling on the trigger when the broom and dust pan implement is selected cause the broom to sweep toward the dust pan.

Figure 11B:
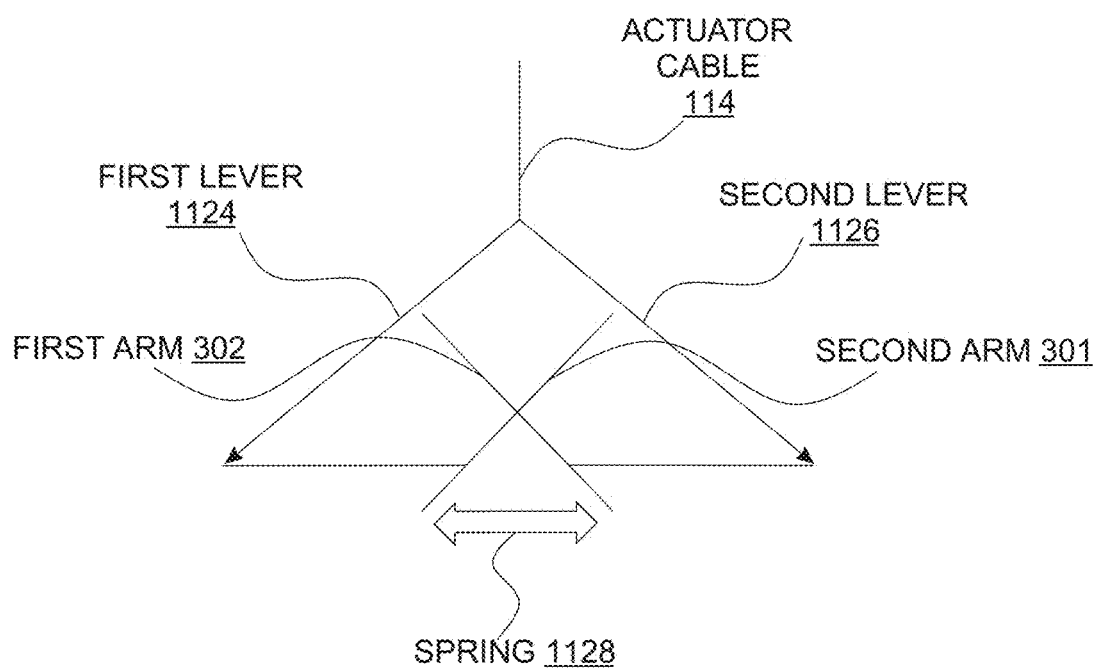
FIG. 11B illustrates how the cable causes a normally closed implement to open.

FIG. 11B depicts an alternative embodiment of the manipulation enabler wherein a spring 1128 holds the implement in a normally closed position Pulling on the trigger, tensions the actuator cable 114, which pulls on a first lever 1124 and a second lever 1126, which action causes the first arm 301 and the second arm 302, connected through the pivot point 412, to separate, thus opening the implement.

In this second embodiment, each of the implements is spring-loaded so that its normal position is closed. For example, the normal position of the pincher is with its two fingers together; the normal position of the broom and dust pan implement is with the broom and dust pan together; and the normal state of the magnetic implement is deenergized. When the user depresses the trigger, that motion pulls on the cable, which has various effects at the distal end, depending on the implement. FIG. 11B depicts how a cable pull has the effect of separating the broom and dust pan or of separating the fingers of the grab or implement to.

Each implement needs only one attachment point for the cable.

In the case of the magnetic complement, a pull on the cable results in connecting the battery, thus energizing the electromagnet.

10. Manufacturing Considerations

The design of the multi-implement hand tool incorporates specific features that facilitate efficient manufacturing and assembly while maintaining high quality and reliability.

10.1. Modular Construction

The tool is designed with a modular approach that allows for efficient manufacturing and assembly:

Subassembly Integration—Major functional components (such as the implement selection mechanism, each implement, and the handle control systems) are designed as distinct subassemblies that can be manufactured and tested separately before final integration.

Standardized Interfaces—The connections between subassemblies utilize standardized interfaces with precise tolerances, ensuring proper fit and function when assembled.

Snap-Fit Components—Where appropriate, components incorporate snap-fit connections that reduce the need for fasteners and accelerate assembly time while maintaining structural integrity.

Service Access Points—The design includes strategically located access points that allow for maintenance or repair of internal components without requiring complete disassembly of the tool.

The design allows substitution of implements via standardized mounting points on the carousel or rail, accommodating user-specific needs like a scraper or brush, any of which can be installed easily.

10.2. Material Selection for Manufacturing

Materials have been selected not only for their functional properties but also for their manufacturability:

Injection-Moldable Polymers—The majority of the external housing and non-load-bearing components are designed to be injection molded from thermoplastic polymers such as ABS, polycarbonate, or glass-filled nylon, allowing complex shapes to be produced efficiently and consistently.

Extrusion-Compatible Metals—The wand shaft and other elongated structural components are designed to use extruded aluminum or other metals, which can be produced continuously and cut to length, reducing manufacturing costs.

Cost-Effective Metal Components—Load-bearing metal components such as pins, axles, and springs are designed to use standard sizes and grades of materials that are readily available and economical.

Overmolding Compatibility—Components requiring non-slip surfaces or enhanced ergonomics are designed with appropriate undercuts and bonding surfaces for efficient overmolding of thermoplastic elastomers (TPE).

10.3. Assembly Optimization

The design incorporates features that facilitate efficient assembly:

Unidirectional Assembly—Components are designed to be assembled primarily from one direction, allowing for simplified assembly fixtures and reducing the need to reorient the product during assembly.

Self-Aligning Features—Critical components incorporate chamfered edges, guide pins, or other self-aligning features that reduce the precision required during assembly and help prevent misalignment.

Captive Fasteners—Where threaded fasteners are necessary, the design incorporates captive fastener features that hold screws in place during assembly, reducing the chance of dropped or misplaced fasteners.

Visual Assembly Indicators-Components that must be oriented in a specific way incorporate visual indicators such as color coding or asymmetrical shapes that make correct orientation immediately apparent.

11. Conclusion

The multi-implement hand tool with user-selectable end effectors represents a significant advancement in hand-operated cleaning and retrieval implements. Through innovative mechanical design and thoughtful integration of multiple functions, the tool provides users with unprecedented versatility and efficiency in a single, compact device.

The purely mechanical nature of the tool eliminates the need for batteries or electrical components, resulting in a product that is environmentally friendly, economical to manufacture, and highly reliable over an extended service life. The ergonomic design and optimized mechanical systems ensure that users of varying strength and dexterity can operate the tool effectively with minimal fatigue.

The synergistic combination of the broom-and-dustpan, grabber, and adhesive foot implements in a single tool, along with the innovative selection mechanism, creates a product that is more than the sum of its parts—a comprehensive solution for a wide range of cleaning and retrieval tasks that would otherwise require multiple separate implements.

The integration of these specific implements reduces task-switching time by a projected 50% compared to separate implements, a synergy not suggested by prior art focused on single-function or detachable designs

I claim:

1. A manually operated, multi-implement hand tool comprising:
    an elongated wand with a proximal handle end and a distal implement end and a longitudinal axis,
    a plurality of implements mounted at the distal end of said wand, said implements comprising at least:
        a broom-and-dustpan implement;
        a grabber implement;
        an adhesive foot implement; and
        a magnet implement;
    a first arm and a second arm connected to engage one selected implement and to each other through a pivot point, having a spring connected between said arms so as to hold the implement in a closed position;
    a rotary carousel selection mechanism that allows a user selectively to position any one of said implements in an operational position, said rotary carousel selection mechanism comprising
        a carousel hub with mounting points for each implement,
        a central axle mounted within ball bearings,
        a selector accessible from the proximal handle section of the wand,
        a gear reduction system connecting a indexing wheel to said carousel hub, comprising a first gear, a second gear, pulleys, and a cable;
        a detent wheel with notches corresponding to each implement position; and
        connectors for each implement that engage the cable when that implement is selected;
    control mechanisms located on the handle section that allow the user to select an implement and to operate it by depressing a trigger;
    a mechanical linkage system that operatively connects said control mechanisms to said implements, said linkage system comprising cables extending from the selector and trigger to the carousel one of flexible links and levers transferring force to the implements, and springs biasing the implements to a default position, all operating without electrical power.

2. The multi-implement hand tool of claim 1, wherein the broom-and-dustpan implement comprises:
    a bristle head with angled synthetic bristles;
    a folding dustpan platform connected to the rotary carousel via a first arm and a second arm, the two arms being connected to via a pivot point and a torsion spring;

said torsion spring, biasing the folding dustpan platform toward a folded position; and said second arm deploying the folding dustpan platform when activated by the deployment trigger.

3. The multi-implement hand tool of claim 1, wherein the grabber implement comprises:
   a first grabber finger (403) connected to a first arm and a second grabber finger (404) connected to a second arm, the arms connected via a pivot point and a torsion spring;
   such grabber fingers having inner surfaces and outer surfaces;
   rubberized gripping pads on the inner surfaces of the grabber fingers;
   a said torsion spring biasing the jaw arms toward an open position;
   dual cables that connect the jaw arms to the squeeze trigger; and
   a compound pulley and gear-reduction system that provides mechanical advantage to reduce the force required to close the jaw arms.

4. The multi-implement hand tool of claim 1, wherein the adhesive foot implement further comprises a protective cover that protects the adhesive foot when not in use.

5. The multi-implement hand tool of claim 1, further comprising a weight distribution system that positions a balance point of the tool approximately 8 inches from the proximal handle end of the handle.

6. A method of using the multi-implement hand tool of claim 1, comprising the steps of:
   selecting an implement by operating a selection mechanism to position a selected implement in an operational position;
   operating a control mechanism corresponding to the selected implement to perform a task; and
   selecting a different implement when a different task is to be performed.

7. The multi-implement hand tool of claim 1, wherein the mechanical linkage system includes a compound pulley system providing a mechanical advantage of at least 2:1 for the grabber implement.

8. The multi-implement hand tool of claim 1, comprising a plurality of implements including at least four selected from the group consisting of a sweeping implement, a grasping implement, an adhesive pick-up implement, a magnetic pick-up implement, a scraping implement, and a brush.

9. A method of manufacturing the multi-implement hand tool of claim 1, comprising the steps of:
   assembling each implement as a separate subassembly;
   assembling the selection mechanism;
   integrating the implements with the selection mechanism;
   assembling the handle section with all control mechanisms;
   installing the mechanical linkage system connecting the control mechanisms to the implements; and
   testing the operation of each implement and the selection mechanism.

10. A manually operated, multi-implement hand tool comprising:
    an elongated wand with a proximal handle end and a distal implement end and a longitudinal axis;
    a plurality of implements mounted at the distal end of said wand, said implements comprising at least: a broom-and-dustpan implement; a grabber implement; an adhesive foot implement; and a magnet implement;
    a plurality of tracks that allows a user selectively to position any one of said implements in an operational position, one track for each implement, said tracks arranged in parallel with each other;
    sliding implement carriers that mount the implements to the tracks;
    push-pull levers each connected to an implement and accessible from the proximal handle section of the wand;
    a spring-loaded locking mechanism that secures a selected implement in the operational position;
    control mechanisms located on the handle end that allow the user to select an implement and to operate a selected implement; and
    a mechanical linkage system that operatively connects said control mechanisms to said implements via the push pull levers, and comprises cables extending from the trigger to a selected implement, pulleys redirecting the cables within the wand, levers transferring force to the implements, and springs biasing the implements to a closed position, all operating without electrical power.

11. The multi-implement hand tool of claim 10, wherein the adhesive foot implement comprises:
    a pad base with a silicone-based, washable adhesive surface;
    a reusable adhesive layer capable of multiple use cycles; and
    a pivoting mount comprising a ball and socket joint that allows multi-directional movement for optimal surface contact.

12. The multi-implement hand tool of claim 10, wherein the magnet implement comprises:
    an electromagnet;
    an integral battery; and
    an actuating circuit permitting the user to connect and disconnect the battery from the electromagnet.

13. The multi-implement hand tool of claim 3, wherein the broom-and-dustpan implement comprises:
    a bristle head with angled synthetic bristles;
    a folding dustpan platform connected to the implement carrier via a hinge;
    a torsion spring that biases the folding dustpan platform toward a folded position; and
    an extension arm that deploys the folding dustpan platform when activated by the deployment trigger.

14. The multi-implement hand tool of claim 10, wherein the grabber implement comprises:
    two opposing jaw arms that pivot around a central axis;
    such jaw arms having inner surfaces and outer surfaces;
    rubberized gripping pads on the inner surfaces of the jaw arms;
    a torsion spring that biases the jaw arms toward an open position;
    dual cables that connect the jaw arms to the squeeze trigger; and
    a compound pulley system that provides mechanical advantage to reduce the force required to close the jaw arms.

15. The multi-implement hand tool of claim 10, wherein the adhesive foot implement comprises:
    a pad base with a silicone-based, washable adhesive surface;
    a reusable adhesive layer capable of multiple use cycles;
    a pivoting mount that allows multi-directional movement for optimal surface contact; and a hinged detachment lever with a wedge-shaped separating edge.

16. The multi-implement hand tool of claim 10, wherein the magnet implement comprises:
 an electromagnet;
 an integral battery; and
 a circuit permitting the user to connect and disconnect the battery from the electromagnet.

\* \* \* \* \*